United States Patent
Suskind et al.

(10) Patent No.: US 9,802,125 B1
(45) Date of Patent: Oct. 31, 2017

(54) ON DEMAND GUIDED VIRTUAL COMPANION

(71) Applicant: The Affinity Project, Inc., Cambridge, MA (US)

(72) Inventors: Ronald Steven Suskind, Cambridge, MA (US); Stuart R. Patterson, Hingham, MA (US); John Nguyen, Lexington, MA (US); Mark Alan Fanty, Norfolk, MA (US); Stephen R. Springer, Needham, MA (US); Erik Martin Gregory, Boston, MA (US)

(73) Assignee: The Affinity Project, Inc., Cambridge, MA (US)

( * ) Notice: Subject to any disclaimer, the term of this patent is extended or adjusted under 35 U.S.C. 154(b) by 0 days.

(21) Appl. No.: 15/166,333

(22) Filed: May 27, 2016

(51) Int. Cl.
*G09B 19/00* (2006.01)
*A63F 13/57* (2014.01)
*A63F 13/25* (2014.01)
*A63F 13/67* (2014.01)

(52) U.S. Cl.
CPC .............. *A63F 13/57* (2014.09); *A63F 13/25* (2014.09); *A63F 13/67* (2014.09)

(58) Field of Classification Search
CPC ........... A63F 13/57; A63F 13/25; A63F 13/67
USPC ........................................................ 434/236
See application file for complete search history.

(56) References Cited

U.S. PATENT DOCUMENTS

| | | | |
|---|---|---|---|
| 6,230,111 B1 | 5/2001 | Mizokawa | |
| 6,731,307 B1 | 5/2004 | Strubbe et al. | |
| 6,795,808 B1 | 9/2004 | Strubbe et al. | |
| 7,606,714 B2 | 10/2009 | Williams | |
| 2004/0147814 A1 | 7/2004 | Zancho et al. | |
| 2008/0077277 A1 | 3/2008 | Park et al. | |
| 2009/0055019 A1* | 2/2009 | Stiehl .................... B25J 9/1671 | |
| | | | 700/249 |
| 2009/0319459 A1 | 12/2009 | Breazeal et al. | |

(Continued)

FOREIGN PATENT DOCUMENTS

| | | |
|---|---|---|
| CN | 104483847 | 4/2015 |
| JP | 2012-93972 | 5/2012 |

(Continued)

OTHER PUBLICATIONS

Acapela Group, "Voice synthesis—Text to Speech| voice solutions" [online], [retrieved on Dec. 2, 2014]. Retrieved from the Internet: http://www.acapela-group.com/, 4 pages.

(Continued)

*Primary Examiner* — Michael Grant
(74) *Attorney, Agent, or Firm* — Fish & Richardson P.C.

(57) ABSTRACT

A first user of a first device may interact with a character presented on the first device where the character presented on the first device is guided by a second user of a second device. To begin a communications session, the first user may request to communicate with the character. A server may process the request to speak with the character and identify the second user from a plurality of guiding users, where the second user is identified by comparing profile information of the first user with profile information of the second user. The server may then send a request to the second device of the second user to guide the character presented by the first device. The first user may then communicate with the character with the guidance of the second user.

19 Claims, 9 Drawing Sheets

(56) References Cited

U.S. PATENT DOCUMENTS

| | | | |
|---|---|---|---|
| 2012/0101847 A1 | 4/2012 | Johnson | |
| 2012/0295510 A1 | 11/2012 | Boeckle | |
| 2013/0090949 A1 | 4/2013 | Tibebu | |
| 2013/0316324 A1* | 11/2013 | Hoffmann | G09B 7/00 434/362 |
| 2013/0326386 A1 | 12/2013 | Vendrell | |
| 2014/0018382 A1 | 1/2014 | DeLack | |
| 2014/0150791 A1 | 6/2014 | Birnkrant | |
| 2014/0156645 A1* | 6/2014 | Brust | G06F 17/30554 707/722 |
| 2014/0212854 A1 | 7/2014 | Divakaran et al. | |
| 2014/0347265 A1 | 11/2014 | Aimone et al. | |
| 2015/0170531 A1 | 6/2015 | Hu et al. | |
| 2015/0294595 A1* | 10/2015 | Hu | G06Q 10/101 434/127 |
| 2015/0336276 A1 | 11/2015 | Song et al. | |
| 2016/0005326 A1 | 1/2016 | Syrmis et al. | |
| 2016/0117953 A1* | 4/2016 | Lluch | G09B 5/02 434/188 |
| 2016/0171387 A1 | 6/2016 | Suskind et al. | |
| 2016/0171971 A1 | 6/2016 | Suskind et al. | |

FOREIGN PATENT DOCUMENTS

| | | |
|---|---|---|
| JP | 5539842 | 7/2014 |
| WO | WO 2013/166146 | 11/2013 |
| WO | WO 2016/099827 | 6/2016 |

OTHER PUBLICATIONS

AITalk® Customer Voice, "Original Voice Dictionary Creating Service" [online], [retrieved on Dec. 2, 2014]. Retrieved from the Internet: http://www.ai-j.jp/english/product/customvoice.html, 2 pages.

Bemelmans et al., "The Potential of Socially Assistive Robotics in Care of Elderly, a Systematic Review," 2011, Third International Conference HRPR 2010, pp. 83-89.

Bohus et al., "Sorry, I Didn't Catch That! —An Investigation of Non-understanding Errors and Recovery Strategies" [online], [retrieved on Dec. 2, 2014]. Retrieved from the Internet: http://www.cs.cmu.edu/~dbohus/docs/nonu_final.pdf ,16 pages.

CereProc, "Voice Creations FAQs" [online], [retrieved on Dec. 2, 2014]. Retrieved from the Internet: https://www.cereproc.com/en/support/faqs/voicecreation, 3 pages.

Cleverscript, "Create a clever script" (conversational AI engine by Existor Ltd ©2012-2014) [online], [retrieved on Dec. 2, 2014]. Retrieved from the Internet: www.cleverscript.com, 2 pages.

Cleverscript, "Manual and Tutorial" [online], [retrieved on Dec. 2, 2014]. Retrieved from the Internet: http://www.cleverscript.com/CSL/CleverScriptManual.pdf, 76 pages.

Existor, "Evie—Electronic Virtual Interactive Entity—Artificial Intelligence is communication".[online], [retrieved on Dec. 2, 2014]. Retrieved from the Internet: http://www.existor.com, 1 page.

Ezzat et al., "Trainable Videorealistic Speech Animation" Massachusetts Institute of Technology [online], [retrieved on Dec. 2, 2014]. Retrieved from the Internet: http://cbcl.mit.edu/cbcl/publications/ps/siggraph02.pdf, 11 pages.

Festvox, "Transform" [online], [retrieved on Dec. 2, 2014]. Retrieved from the Internet: http://www.festvox.org/transform/, 2 pages.

iSpeech, "Powerful Speech Platform" [online], [retrieved on Dec. 2, 2014]. Retrieved from the Internet: http://www.ispeech.org, 7 pages.

Hamilton, "Eugene Goostman versus Siri" (Jun. 10, 2014) [online], [retrieved on Mar. 16, 2016]. Retrieved from the Internet: http://www.lauradhamilton.com/eugene-goostman-versus-siri, 3 pages.

Massachusetts Institute of Technology, "Scientists collaborate internationally to identify the neural mechanisms and possible benefits of 'Affinity Therapy' in children with autism" (Apr. 24, 2014) [online], [retrieved on Dec. 2, 2014]. Retrieved from the Internet: https://iacc.hhs.gov/non-iacc-events/2014/nimh_lecture_ron_suskind_042414.pdf, 1 page.

Pappu et al., "Predicting Tasks in Goal-Oriented Spoken Dialog Systems using Semantic Knowledge Bases" *Proceedings of the SIGDIAL 2013 Conference*, pp. 242-250 (Aug. 22-24, 2013) [online], [retrieved on Dec. 2, 2014]. Retrieved from the Internet: https://aclweb.org/anthology/W/W13/W13-4038.pdf, 9 pages.

Screaming Bee Inc., "MorphVOX Pro Voice Change" [online], [retrieved on Dec. 2, 2014]. Retrieved from the Internet: http://www.screamingbee.com/, 1 page.

SitePal, "Text-to-Speech" [online], [retrieved on Dec. 2, 2014]. Retrieved from the Internet: http://www.sitepal.com/ttswidgetdemo/, 1 page.

Strannegard et al., "A General System for Learning and Reasoning in Symbolic Domains" [online], [retrieved on Dec. 2, 2014]. Retrieved from the Internet: http://agi-conf.org/2014/wp-content/uploads/2014/08/strannegard-general-agi14.pdf, 12 pages.

Suskind, "Life, Animated: A Story of Sidekicks, Heroes, and Autism," Apr. 2014, 358 pages.

The New York Times, "Inside the Mind of a Child with Autism," written by Benedict Carey on Apr. 7, 2014 [online], [retrieved on Dec. 2, 2014]. Retrieved from the Internet: http://well.blogs.nytimes.com/2014/04/07/inside-the-mind-of-a-child-with-autism/?_r=0, 3 pages.

Wired.Co.Uk, "IBM reveals 'brain-like' chip with 4,096 cores," written by Daniela Hernandez on Aug. 8, 2014 [online], [retrieved on Dec. 2, 2014]. Retrieved from the Internet: http://www.wired.co.uk/news/archive/2014-08/08/ibm-brain-like-chip, 8 pages.

Yale Daily News, "Suskind sparks autism research," written by Eddy Wang on Apr. 15, 2014 [online], [retrieved on Dec. 2, 2014]. Retrieved from the Internet: http://yaledailynews.com/blog/2014/04/15/suskind-sparks-autism-research/, 2 pages.

International Search Report and Written Opinion for App. Ser. No. PCT/US15/62416, dated Feb. 5, 2016, 11 pages.

U.S. Appl. No. 15/229,074, filed Aug. 4, 2016.

U.S. Appl. No. 15/229,070, filed Aug. 4, 2016.

Levy, "Siri's Inventors Are Building a Radical New AI that Does Anything You Ask" (Aug. 12, 2014) [online], [retrieved on Mar. 16, 2016]. Retrieved from the Internet: http://www.wired.com/2014/08/viv/, 2 pages.

Leuski et al., "NPCEditor: A Tool for Building Question-Answering Characters" [online], [retrieved on Dec. 2, 2014]. Retrieved from the Internet: http://people.ict.usc.edu/~leuski/publications/papers/npceditor.pdf, 8 pages.

U.S. Appl. No. 15/166,507, filed May 27, 2016.

U.S. Appl. No. 14/571,472, filed Dec. 16, 2014.

U.S. Appl. No. 15/015,891, filed Feb. 4, 2016.

U.S. Appl. No. 61/916,701, Hu et al, filed Dec. 16, 2013.

\* cited by examiner

Hero Profile

| Hero ID: | 30403 |
|---|---|
| Name: | Dan Smith |
| Age: | 12 |
| Gender: | M |
| Personality Type: | INTJ |
| Diagnosis: | Autistic Disorder |
| Vocabulary: | 5 |
| Communication Skills: | 3 |
| Affinities: | [Harry Potter; Lion King] |
| Goals: | [Being comfortable in a new place; Bonding; Social and emotional skills] |

Fig. 3A

Coach Profile

| Coach ID: | 98234 |
|---|---|
| Available: | Yes |
| Name: | Mary Jones |
| Age: | 42 |
| Gender: | F |
| Personality Type: | ENFJ |
| Hero Experience: | [43759, 30403, 27359] |
| Skill Level: | 8 |
| Specialties: | [Autistic Disorder, Alzheimer's] |
| Affinities: | [Harry Potter; Cars; Toy Story] |
| Goals: | [Fun; Being comfortable in a new place; Believing in yourself] |
| Rating: | 10 |

Fig. 3B

ON DEMAND GUIDED VIRTUAL COMPANION

BACKGROUND

Individuals with special needs, such as children with autism, may find it difficult to interact socially with other people, such as their parents, friends, and people they are meeting for the first time. These special needs individuals may have an easier time communicating with a computer-generated virtual companion, such as personal assistants or avatars on smart phones. While the special needs individual may be able to communicate more easily with a computer-generated virtual companion, the virtual companion may have limited capabilities and may not be able to provide functionality to assist the special needs individual. What is needed is a virtual companion that is specifically adapted to communicate with the special needs individual and also assist the special needs individual with tasks in his daily life.

BRIEF DESCRIPTION OF THE FIGURES

The invention and the following detailed description of certain embodiments thereof may be understood by reference to the following figures:

FIG. 3A illustrates an example profile of a Hero.

FIG. 3B illustrates an example profile of a Coach.

DETAILED DESCRIPTION

Described herein are techniques for assisting a special needs individual, who we will refer to as the "Hero," such as by assisting the Hero in learning life skills. The Hero may have difficulty in interacting with people and may be reluctant to speak or have difficulties when communicating with another person. For example, the Hero may have autism, attention deficit disorder, or Alzheimer's disease. The Hero may have an easier time communicating with a computer-generated character that is presented on a device, such as a smartphone. For example, the Hero may find it easier to speak to a virtual personal assistant, such as Apple's Siri, than to speak to another person. In some implementations, the Hero may be a neuro-typical person and not have any special needs.

While the Hero may have an easier time communicating with an automated personal assistant, the personal assistant may not be particularly helpful in teaching the Hero skills, such as skills associated with emotional and physical regulation, social skills, executive functioning, interpersonal communication, and other aspects of our social culture that are typically not taught explicitly to those without special needs. We will refer to the foregoing skills as "life skills." What is needed is a computer-generated character that can interact with the Hero but also help the Hero, such as by helping the Hero learn life skills. In some implementations, a Coach (described in greater detail below) may be able to help guide how the computer-generated character interacts with the Hero. For example, the Coach may be parent or caretaker, and the Coach may be able to control or influence the words spoken by the computer-generated character.

The computer-generated character will be referred to herein as a virtual companion or a Sidekick (Sidekick and Sidekicks are trademarks of The Affinity Project). A Sidekick may be an existing cartoon character, such as Mickey Mouse, or may be a new character created specifically for the purpose of communicating with a particular Hero or Heroes in general. A Sidekick has an associated appearance, personality, and voice.

Individuals who guide how the Sidekick interacts with the Hero will be referred to as Coaches. Coaches may include any person who is assisting in guiding a Sidekick, such as parents, other family members, teachers, therapists, other medical professionals, or other individuals.

Coaches, Heroes, and Sidekicks may be characterized in ways and may interact with one another using any of the techniques described in U.S. patent application Ser. No. 15/015,891, titled "Guided Personal Companion," and filed on Feb. 4, 2016; and U.S. patent application Ser. No. 14/571,472, titled "Digital Companions for Human Users," and filed on Dec. 16, 2014; each of which is hereby incorporated by reference in their entireties for all purposes.

Figure 1:
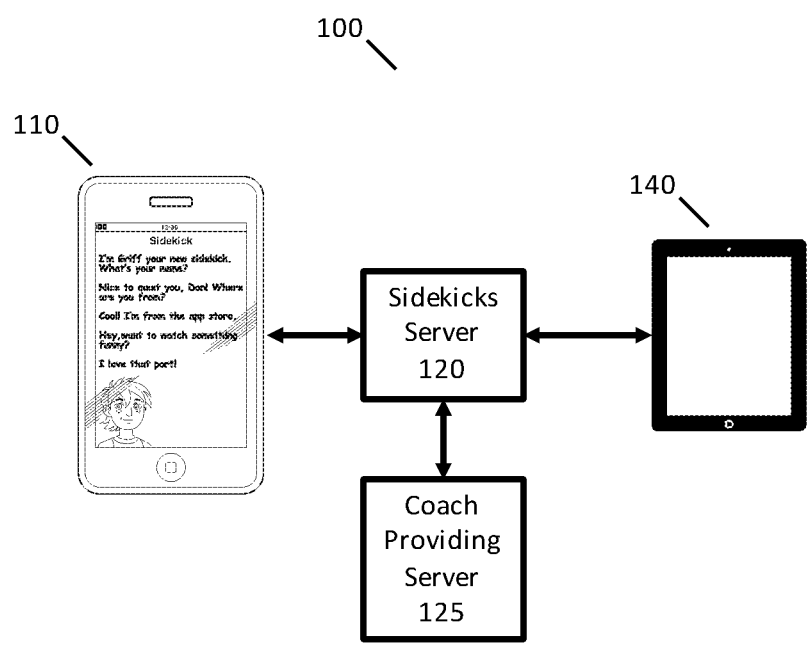
FIG. 1 illustrates a Hero interacting with a virtual companion on a device where a Coach is guiding the virtual companion.

FIG. 1 shows an example of a system 100 where a Coach may guide how a Sidekick interacts with a Hero. The Hero may have a Hero computing device 110, which may be a smart phone, smart watch, or any other type of computing device. The Hero device 110 may have an application that allows the Hero to interact with a Sidekick. The Coach may have a Coach computing device 140, which may be a personal computer, tablet, smart phone, or any other type of computing device. Coach device 140 may have an application that allows the Coach to guide how the Sidekick interacts with the Hero. FIG. 1 shows only one Hero and one Coach, but a single Hero may interact with multiple Coaches and vice versa.

The overall service that allows a Hero to interact with a Sidekick with the assistance of a Coach will be referred to as the "Sidekicks service." A company may provide the Sidekicks service that allows Heroes and Coaches to communicate as set forth in the system 100 of FIG. 1. For example, a company may provide software that can be installed on or used with a Hero Device and a Coach device (e.g., an installed application or a web page) and may also provide access to server computers, such as server 120, that provide the functionality described herein. In some implementations, a Sidekicks service may also operate a Coach-providing service that assists in finding a Coach, as described in greater detail below, and a Coach-providing service may be implemented using Coach providing server 125 (or may be part of Sidekicks server 120). In some implementations, coach providing server 125 may be operated by a different company than Sidekicks server 120.

For clarity in the presentation, (i) an example Hero device will be generally described as a smartphone that has a touchscreen, camera, microphone, and speakers, where the Hero interacts with the device by touching or viewing the screen, speaking into the microphone, listening to audio from a speaker, or making use of the camera; (ii) an example application on the Hero device will be generally described as a special-purpose application installed on the smartphone (such as installed from an app store); (iii) an example Coach device will be generally described as a personal computer where the Coach interacts with the device by clicking a mouse, typing on a keyboard, listening to audio from a speaker, or dictating commands; and (iv) an example application on the Coach device will be generally described as a web browser displaying a web page of the Sidekicks service. The techniques described herein are not, however, limited to these particular types of devices and applications running on the devices, and the devices need not have all of the characteristics described above. For example, the Hero device may instead be a personal computer that the Hero uses to access web page using a browser, and the Coach device may instead be a phone or a tablet with a special purpose application.

The Hero may open an application on Hero device 110 to begin interaction with the Sidekicks service. The application may present a graphic of a Sidekick and welcome the Hero by playing a greeting, such as "Welcome Dan!" by using a text-to-speech (TTS) voice created for the Sidekick. The Hero may speak to the Sidekick, and the Hero's voice may be captured by a microphone of Hero device 110, transmitted to the Coach device 140, and played, in real time, on speakers of the Coach device 140. In other configurations, the Hero might communicate with the Sidekick by using a keyboard or a virtual keyboard. Even when the Hero communicates using a keyboard or is not communicating at all, audio captured by a microphone of the Hero device may still be transmitted to the Coach so that the Coach can better understand the Hero's environment and mood.

The Coach may then determine an appropriate response for the Sidekick to speak. The Coach may type the response on Coach device 140. The Coach may also provide the response by speaking and using automated speech recognition to generate the response text. The text of the response may then be converted to audio using the TTS voice of the Sidekick, and the audio may be played from Hero device 110, and/or be displayed on the Hero device 110, so that it appears to the Hero that the Sidekick is automated (e.g., not being guided by a Coach).

System 100 may have a Sidekicks server 120 or Coach providing server 125 that assists with the above interactions. For example, Sidekicks server 120 and/or Coach providing server 125 may facilitate network connections between Hero device 110 and Coach device 140, may perform operations such as generating audio using the TTS voice of the Sidekick, may identify Coaches to assist a Hero, or may perform any other operation to assist with the above interactions.

In some implementations or situations, a Hero may interact with the Sidekick without the assistance of a Coach and operations or responses of the Sidekick are automated in that they are generated by a computer program. When the Sidekick is automated, the Hero may be to perform interactions such as the following: ask general questions (e.g., what is the weather tomorrow or what is the capital of Montana), ask questions about the Hero's own life (e.g., query the Hero's calendar), perform Internet searches, request audio or video clips, or have a conversation with the Sidekick where the Sidekick's responses are automated (such as a chatbot). The Hero device 110 may implement the automation of the Sidekick or the Hero device may be connected to one or more servers that assist with or implement automation of the Sidekick, such as Sidekicks server 120. Any appropriate techniques may be used to automate the operations or responses of the Sidekick and the techniques described are not limited to any particular methods for automation. For example, in some implementations, automation may be performed by using techniques found in existing smartphone personal assistants, such as Siri or Google Now, or techniques used to implement chat bots or chatterbots.

Coaches On Demand

A Hero may request the assistance of a Coach in guiding a Sidekick that interacts with the Hero. In some implementations, the Sidekick may not be automated and a Coach is required to allow a Hero to interact with a Sidekick. In such implementations, a Hero may simply request to interact with a Sidekick and need not be aware that a Coach is guiding the operation of a Sidekick. In some implementations, a Sidekick may have at least some automated capabilities, and a Hero may request the assistance of a Coach where the Hero desires interactions that go beyond the automated functionality of the Sidekick. For example, the automated operations of the Sidekick may be limited to playing movie clips requested by the Hero, and the Hero may request assistance of a Coach when the Hero is having difficulties in interacting with other people.

In some implementations, a Coach may be requested on behalf of the Hero without the knowledge of the Hero, as described in greater detail below. For example, a Hero may be interacting with an automated version of the Sidekick, and it may be automatically determined that the Hero is stressed and needs assistance. Algorithms may be implemented that process communications with the Hero and sensor data (e.g., biometric wristband, audio and/or video of the Hero) and determine that the Hero is stressed. The stress level of the Hero as determined by the algorithm may then be used to request a Coach on behalf of the Hero to assist the Hero with the stressful situation A parent may use the Sidekicks service with their child where the parent is the Coach and the child is the Hero. In such situations, the Hero may desire to interact with the Sidekick more often than the parent is available to play the role of the Coach. Or the parent may desire to allow the Hero to interact with Sidekick more often than the parent is available to provide assistance. To allow the Hero to interact with the Sidekick more often, the role of the Coach may be shared with other people in addition to parents. For example, another parent, siblings of the Hero, other family members of the Hero, or medical professionals treating the Hero may play the role of the Coach. In some implementations, a Coach-providing service may be used where Coaches are made available on demand (or according to a schedule or by reservation) to guide a Sidekick for a Hero. A Coach-providing service may be part of the Sidekicks service or may be a service provided by a separate company and that is integrated with the Sidekicks service.

Figure 2:
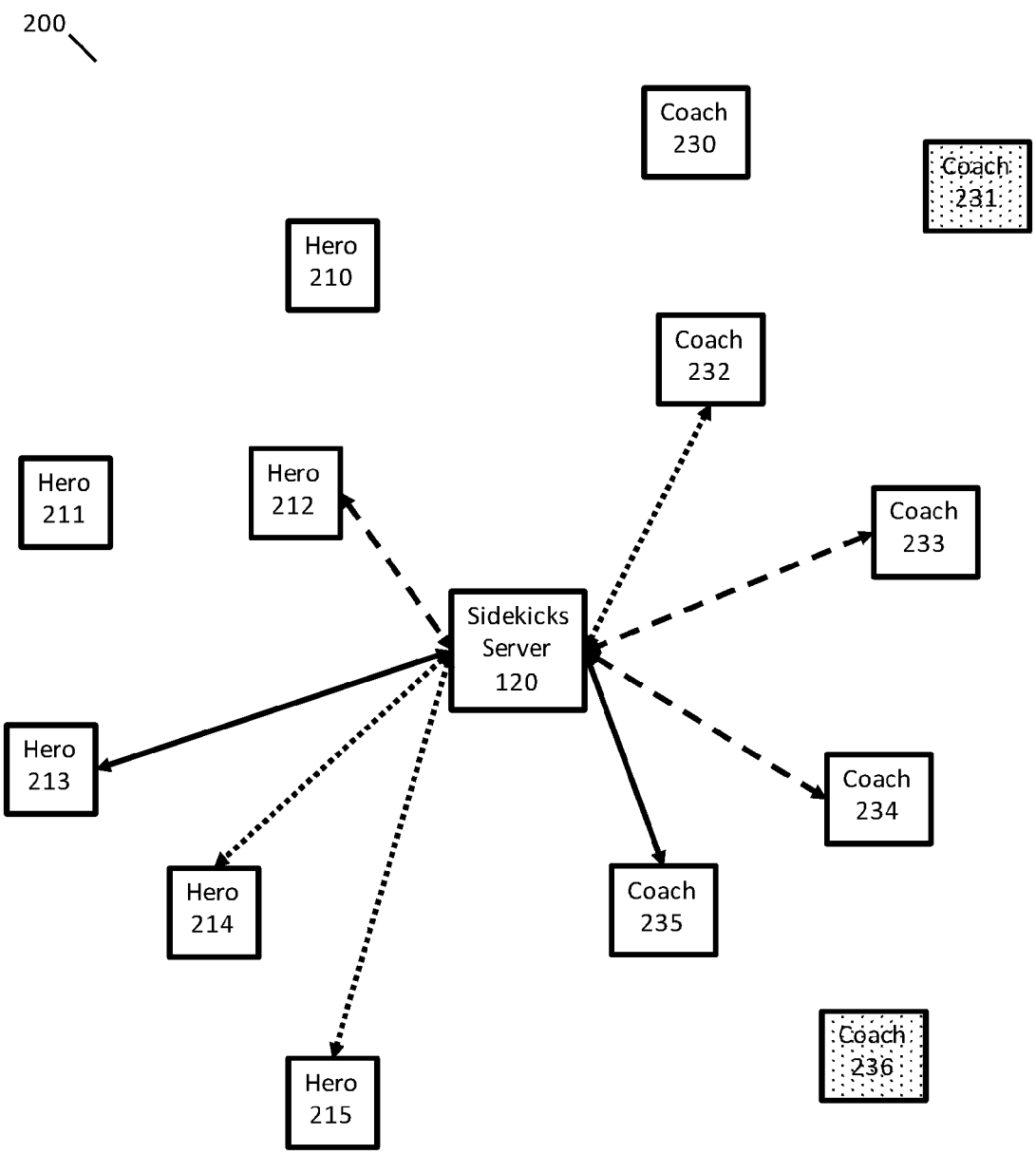
FIG. 2 a system of Hero devices and Coach devices where Coaches are guiding virtual companions on Hero devices.

FIG. 2 shows an example of a system 200 with multiple Heroes and Coaches where a Sidekicks server 120 assists in finding a Coach to guide a Sidekick for a Hero. In FIG. 2, multiple Heroes 210-215 are present and each Hero may have his own Hero device for interacting with a Sidekick. FIG. 2 also has multiple Coaches 231-236 who may be available to guide a Sidekick for a Hero, and each Coach may have a Coach device. Some Coaches may not be available at any given time, and in FIG. 2, Coach 231 and Coach 236 are shaded to indicate that they are not available.

A Coach may be requested on behalf of a Hero (e.g., requested by the Hero himself, requested by another person, or automatically requested). A request for a Coach for a Hero may be transmitted to Sidekicks server 120. Sidekicks server 120 may have or may have access to a data store that includes a list of Coaches that are able to assist the Hero. In some implementations (as described in greater detail below), the set of Coaches suitable to assist a Hero may depend on the identity of the Hero or other qualities of the Hero (e.g., disability, affinities, etc.).

Sidekicks server 120 may retrieve a list of Coaches that are available and/or suitable to assist the Hero, and then use the list to select one or more Coaches to assist the Hero. For example, Sidekicks server 120 may send a notification to all of the Coaches on the list simultaneously, and the first Coach who responds may be selected to assist the Hero. In another example, Sidekicks server 120 may prioritize the order of the Coaches and sequentially send requests to Coaches until a Coach responds that he is available to assist the Hero. The techniques described herein are not limited to these examples, and any appropriate technique may be used to select a Coach. After a Coach has been selected, the Hero and Sidekick may participate in a communications session where the selected Coach is guiding the Sidekick.

In the example of FIG. 2, four communication sessions are taking place. First, Hero 213 is interacting with a Sidekick that is being guided by Coach 235 as indicated by the solid lines. Second, Hero 212 is interacting with a Sidekick that is being guided by both Coach 233 and Coach 234 as indicated by the dashed lines. Third, Hero 214 is interacting with a Sidekick that is being guided by Coach 232 as indicated by the dotted lines. Fourth, Hero 215 is interacting with a Sidekick that is also being guided by Coach 232 as indicated by the dotted lines (Coach 232 is simultaneously guiding Sidekicks for both Hero 214 and Hero 215).

In some implementations, at least some of the Coaches available and/or suitable to assist a Hero may be part of a paid service operated specifically for the purpose of providing Coaches on demand to assist Heroes. A person may sign up or register with the Coach-providing service, receive an evaluation and/or training to learn how to guide a Sidekick for a Hero, and then work as a Coach on demand.

A Coach may undergo training before being allowed to assist Heroes. Because Heroes may have disabilities, Heroes may have difficulty communicating or behave in unexpected ways. As part of the training procedure, a Coach may be trained to learn how to better communicate with Heroes and provide assistance that is beneficial to the Heroes. The Coaches may be trained using any suitable techniques. For example, a communications session may be simulated by having another person (e.g., an already trained Coach or a parent) play the role of the Hero, and the Coach in training providing responses. The person playing the role of the Hero may use transcripts of actual Heroes to better simulate a real-life session. A Coach may also be trained by communicating with a chatbot that has been trained to communicate in a manner similar to a Hero. The training may be specific to particular types of Heroes, such as Heroes with autism or Heroes with Alzheimer's disease. A Coach may undergo multiple trainings to be able to interact with different types of Heroes or to increase his skill level to handle more difficult situations. The performance and/or evaluation of a Coach during training may also indicate which types of Heroes for which the Coach is a suitable match.

A Coach may provide services from any convenient location. For example, the Coach may be at home, may be at a coffee shop (assuming privacy is not needed), or travel to an office where other coaches are working (e.g., an office of a Coach-providing service). The Coach may sign in to an application or a website on a Coach device and start the process of providing coaching services. When the Coach signs in, the status of the Coach may be updated in a data store of Coaches to indicate that the Coach is available. The Coach may then wait for a request to provide coaching services. In some implementations, a Coach may perform an action after signing in to indicate that that Coach is available, such as by selecting a user interface control, and the status of the Coach may be updated in the data store of Coaches in response to the action.

After signing in, the Coach may receive a request to provide guidance to a Sidekick for a Hero. In some implementations, the Coach may be obligated to accept the request, and in some implementations, the Coach may have some discretion to decide whether to accept or refuse the request. For example, for a Coach who is at home, the Coach may have other obligations and may only be available during some portions of the day although the Coach is signed in for the entire day.

In some implementations, the Coach may be provided with information about the Hero, either before or after accepting the request. For example, the name, age, picture, disability, usage history, affinities, and goals of the Hero may be presented to the Coach. Receiving this information may make it easier for the Coach to provide assistance because the Coach may better understand the situation of the Hero. Where the Coach receives this information before accepting a request, the Coach may use this information to decide whether he would like to respond to the request or whether he is well suited to assist this particular Hero.

In some implementations, after signing in, the Coach may immediately be presented with a list of Heroes who are awaiting assistance. For example, where there are more Heroes seeking assistance than there are Coaches available, a Hero may have to wait to receive the assistance of a Coach. A Coach may review the list of Heroes and select a Hero to assist. In some implementations, a Coach may simply be assigned a Hero to assist and may not have a choice.

After a Coach has accepted a request or been assigned a Hero, the Coach may begin a communications session where the Coach guides the Sidekick for the Hero. As described above and in the incorporated patent applications, the Coach receives information about the Hero, such as audio and/or video of the Hero or text typed by the Hero. The Coach may select or formulate a response for the Sidekick and the response may be spoken by the Sidekick on the Hero device using a text-to-speech voice of the Sidekick or may be presented on the display of the Hero device as text.

In some implementations, a Coach may assist more than one Hero simultaneously. For example, the display of the Coach device may have a split screen where a first portion of the screen presents information about a first communications session with a first Hero and a second portion of the screen present information about a second communications session with a second Hero. By selecting controls in the two portions of the screen, the Coach may guide a Sidekick for each of the two Heroes.

In some implementations, more than one Coach may assist a single Hero. For example, a Coach of a Coach-providing service ("paid Coach") may be working with a parent of the Hero who is also playing the role of a Coach ("parent Coach"). The parent Coach may be training the paid Coach so that the paid Coach may learn more about the needs of the Hero, or alternatively, the paid Coach may assist the parent Coach in learning how to be a Coach with the Sidekicks service. In another example, an inexperienced Coach of the Coach-providing service may be learning or may be trained by a more experienced Coach of the Coach-providing service.

Any suitable user interface may be used to allow more than one Coach to simultaneously guide a Sidekick for a Hero. For example, a user interface may have a section that allows the Coaches to communicate directly with one another without the Hero knowing. The user interface may allow one Coach to have control or the "talking stick" and be able to send guidance to the Sidekick while the other Coach may only observe. The Coach with control may then pass control to the other Coach.

During a communications session with a Hero, a Coach may desire the assistance of another Coach or that another Coach take over guidance of the Sidekick for the Hero. For example, the Coach's work shift may be ending or a Coach may be having difficulty in effectively communicating with the Hero and request help from the parent or a more experienced Coach. In addition, the Sidekicks service may monitor the performance of the Coach (e.g., automatically or by a person) and determine that the session is not going well (e.g., the Hero is stressed), and the Sidekicks service may initiate the process of finding an additional or replacement Coach.

The request of an additional or replacement Coach may proceed in a similar manner as the original request for a Coach with one difference being that the request may originate with a Coach instead of by or on behalf of the Hero. The Sidekicks service may select an additional Coach using any of the techniques described above.

When replacing a Coach, an "old" Coach may request a "new" Coach. The two Coaches may overlap for a period of time to allow the new Coach to familiarize himself with the state of the communications session with the Hero. For example, the new Coach may observe the old Coach communicating with the Hero for a period of time (the Coach-providing service may enforce a minimum amount time, such as 5 minutes), and when the new Coach is comfortable taking control, the new Coach can take over, and the old Coach may leave the communications session.

When an additional Coach is requested, the "existing" Coach is requesting assistance from an "additional" Coach. For example, the additional Coach may be a parent who knows the Hero well, a medical professional, or a more experienced Coach. Together, the existing Coach and additional Coach can guide the Sidekick to provide assistance to the Hero. The additional Coach may be better able to help the Hero with a difficult issue. In some implementations or situations, the additional Coach may take over and the existing Coach may leave the session to assist other Heroes, or the additional Coach may provide assistance for a period of time, and then depart to allow the existing Coach to continue in the session without the additional Coach.

When a Coach has finished a communications session, the Coach may then sign out of the Coach-providing service. After signing out, the data store of Coaches may be updated to indicate that the Coach is no longer available.

In selecting a Coach for a Hero, the Coach-providing service may use information about the Hero and/or the Coach in making the selection. For example, some Coaches may have experience or specialties that make them better suited for some Heroes. Below some example criteria are presented for selecting Coaches for Heroes, but the techniques described herein are not limited to these examples and any suitable criteria may be used to select a Coach.

Sidekicks server 120 may have or have access to a data store of information about Heroes. For example, a data store may include information about a Hero in the form of a Hero profile. As used herein, a "profile" comprises any format for storing information about a person in a data store and is not limited to any particular structure or organization. A Hero profile may include any relevant information about a Hero, including but not limited to a unique Hero ID, name age, gender, personality type (e.g., Meyers-Briggs), diagnosis or disability, skill levels (e.g., vocabulary, communication, processing speed, sustained attention), affinities, or goals (e.g., as selected by a parent or medical professional). A Hero profile may also include or be associated with information about recently conducted sessions, such as transcripts of the sessions or summaries of the sessions (described in greater detail below). The information about the recently conducted sessions may indicate, for example, recent goals worked on by the Hero or frequently worked on goals. FIG. 3A illustrates an example of some information that may be stored in a Hero profile.

Sidekicks server 120 may have or have access to a data store of information about Coaches. For example, a data store may include information about a Coach in the form of a Coach profile. A Coach profile may include any relevant information about a Coach, including but not limited to a unique Coach ID, name age, gender, personality type (e.g., Meyers-Briggs), whether the Coach is currently available to assist, Heroes the Coach has previously assisted, skill levels or experience levels for one or more criteria (e.g., age of Hero, diagnosis or disability of Hero, skill level of Hero), knowledge of affinities, experience with particular goals, or a rating. For example, some Coaches may be better suited to assisting Heroes in the 5-8 age group, who have attention-deficit disorder, and who are working on the goal of "Being comfortable in a new place." FIG. 3B illustrates an example of some information that may be stored in a Coach profile.

In selecting a Coach for a Hero, a Coach-providing service may use the Hero profile to select one or more Coaches using the Coach profiles. The techniques used to select a Coach may be the same for all Heroes, or, in some implementations, the selection algorithm may be individually tailored for each Hero. Any appropriate searching techniques and search criteria may be used to select a Coach. For example, some criteria may be mandatory and only Coaches meeting that criteria will be considered for a particular Hero (e.g., for a Hero who is low-functioning autistic only Coaches with a skill level of at least 8 on a 10-point scale will be considered).

Other criteria may not be mandatory but may be used to generate a suitability score for a Coach, and a Coach may be selected using the suitability score. For example, for a male Hero, a male Coach may result in a higher suitability score than a female Coach. Suitability scores may be computed in any appropriate way. For example, an overall suitability score may be computed as a weighted sum of individual scores where each individual score corresponds to a criterion from a Coach profile. An individual score for a particular criterion may be determined based on rules relating to the value itself (e.g., an individual score for gender is 10 if the Coach gender is the same as the Hero gender and 0 otherwise) or relating to a match with a corresponding criterion for the Hero (e.g., an individual score for age being a difference between the Hero age and the Coach age).

In some implementations, a Coach may be selected as follows. A request is received from a Hero and the Hero profile is retrieved from the data store. Using the Hero profile, a set of Coaches are selected from the data store who meet the mandatory requirements for this Hero. For each of the selected Coaches, a suitability score is computed using the information from the Coaches' profiles. A top scoring Coach may be selected and requested for the Hero. Alternatively, the top-N (e.g., top 10) Coaches may be selected, a request sent to each of the top-N Coaches, and the first Coach to respond is selected to assist the Hero.

In some implementations or situations, the request for a Coach may be accompanied by additional information. For example, where a Coach is currently assisting a Hero and is requesting assistance from a Coach with a higher skill level, a minimum skill level may be used in selecting the Coach. In another example, information about the current stress level of the Hero (as described in greater detail below) may be known, and this information may be used in selecting a Coach. The additional information may be used to modify the search for a Coach. For example, a minimum Coach skill level may be increased or it may be mandatory that the Coach is also a medical professional. In some implementations, a person may be involved in selecting a Coach or confirming that an automated selection is suitable.

Where a Coach is provided by a Coach-providing service, the Coach may not be known to the parents of the Hero, and the parents of the Hero may wish to review a session between their child (the Hero) and the Coach to make sure that the Coach provided proper assistance to their child. Following a session between a Hero and a Coach, the session may be summarized or modified to make it easier for parents of the Hero to review.

In some implementations, a complete transcript of the session may be provided to the parents. Where the Hero is speaking to the Sidekick, speech recognition may be used to obtain a transcript of the Hero's speech. The guidance of the Coach may already be in text form since the Sidekick may have communicated with the Hero by generating audio from text or by presenting text on the screen, but, where needed, speech recognition may also be performed on speech of the Coach. The parents may review the session transcript to review the performance of the Coach.

In some implementations, audio of the session may be provided to the parents. By hearing the audio, the parents may be able to better understand the emotional state of the Hero and the effect of the guidance by the Coach. The audio may be condensed for more convenient review by the parents. For example, silence between words or phrases may be removed and/or the audio may be speeded up using signal processing techniques. In some implementations, the transcript may by time stamped and linked to the audio so that the parents can easily listen to a portion of the audio.

In some implementations, where video of the Hero is recorded during the communications session, the video of the Hero during the session may be provided to the parent as well and may be condensed and linked to the transcript. In some implementations, where biometric data of the Hero is recorded, a summary or portion of the biometric data may be included in the transcript and/or linked to the transcript. In some implementations, a change in emotional state may be automatically determined from the session data (e.g., audio, video, and biometric data) and the change in emotional state of the Hero may be noted in the transcript. For example, a particular communication may have made the Hero happy or angry and this change in emotional state may be automatically detected and noted in the transcript.

In some implementations, a Coach may write a summary of the most important aspects of the session to make it easier for the parent to review. For example, the Coach may summarize the progress of the Hero in achieving the goals of the session and may provide suggestions for future sessions. In writing the summary, the Coach may indicate or link to portions of the transcript or associated audio/video to allow the parents to review the most pertinent portions of the session.

In some implementations, a person other than the Coach may review the session (e.g., transcript or audio/video) and provide a summary of the session. For example, a medical professional may review the session, evaluate the progress of the Hero, and write up a session plan for the next session. A review and summary of the session (whether by the Coach or another person) may be an optional feature of a Coach-providing service and that is provided for an additional fee.

The performance of the Coach during a session may be evaluated or rated. The Coach may be evaluated by the parents, evaluated by the Hero, evaluated by a medical professional, evaluated by other people of the Coach-providing service, or evaluated automatically by processing a transcript, audio, and/or video of the session.

Where the Coach is evaluated by a person (whether the parent, Hero, or other person), the evaluation may use any appropriate scale, such as a ranking from 1 to 5, from 1 to 10, or a simple approve/disapprove. The person may give the Coach an overall rating and/or rate the Coach according to multiple criteria, such as building rapport with the Hero, length of time to respond to the Hero, or effectiveness in achieving goals with the Hero. The techniques described herein are not limited to any particular type of evaluation or rating and any suitable evaluation techniques may be used.

In some implementations, a Coach may be evaluated automatically by processing a transcript, audio, and/or video of the session. Any suitable criteria may be used for automatic evaluation, including but not limited to the following: the average delay between the Hero speaking and the Coach providing a response, the average delay between the Sidekick communicating to the Hero and the Hero providing a response (indicating how well the Coach is eliciting responses from the Hero), the duration of or the number of words in a Hero response (same), or the total length of the session. These metrics or other metrics may be automatically determined from the transcript, audio, and/or video of a session, and the metrics may be combined to generate a rating for the performance of the Coach during the session.

A Coach may be evaluated during a session with a Hero using any of the techniques described above (e.g., automatically or by another person). If a Coach has a low evaluation during a session, a second Coach may be requested to either assist the existing Coach or to replace the existing Coach, such as by using any of the techniques described above. For example, a Sidekicks server may run an algorithm to continuously to monitor the performance of a Coach during a session, and if the performance level of the Coach during a session drops below a threshold, the Sidekicks server may send out a request to obtain a second Coach to assist or replace the existing Coach.

The evaluation of the Coach (whether done by a person or automatically) may be stored in association with the profile of the Coach. The evaluations of Coaches may be used to improve the Coach-providing service. For example, in selecting Coaches, higher-rated Coaches may be given preference over lower-rated Coaches. Coaches with lower ratings may be given additional training to improve their performance or may be terminated from the Coach-providing service.

The Coaches may be compensated either directly or indirectly for their services in assisting a Hero. In some implementations, the Coach-providing service may charge a fee to a parent of the Hero based on the amount of time that a Coach assists the Hero. The fees may be based on other factors as well, such as the skill level of the Coaches being used to assist a Hero. The fee for a Coach with a higher skill level may be greater than for a Coach with a lower skill level. When signing up for the Coach-providing service, a parent may indicate a minimum skill level of the Coaches to be allowed to assist the Hero. The Coach-providing service may then compensate the Coaches using any appropriate payment plan, such as paying them hourly. In some implementations, the parents of a Hero may coordinate directly with a Coach and pay the Coach an hourly rate. In some implementations, other features and/or services may be provided for an additional charge, such as having a medical professional review a transcript of a session with a Hero, provide an evaluation of the Hero, and/or provide recommendations for future sessions with the Hero.

Figure 4A:
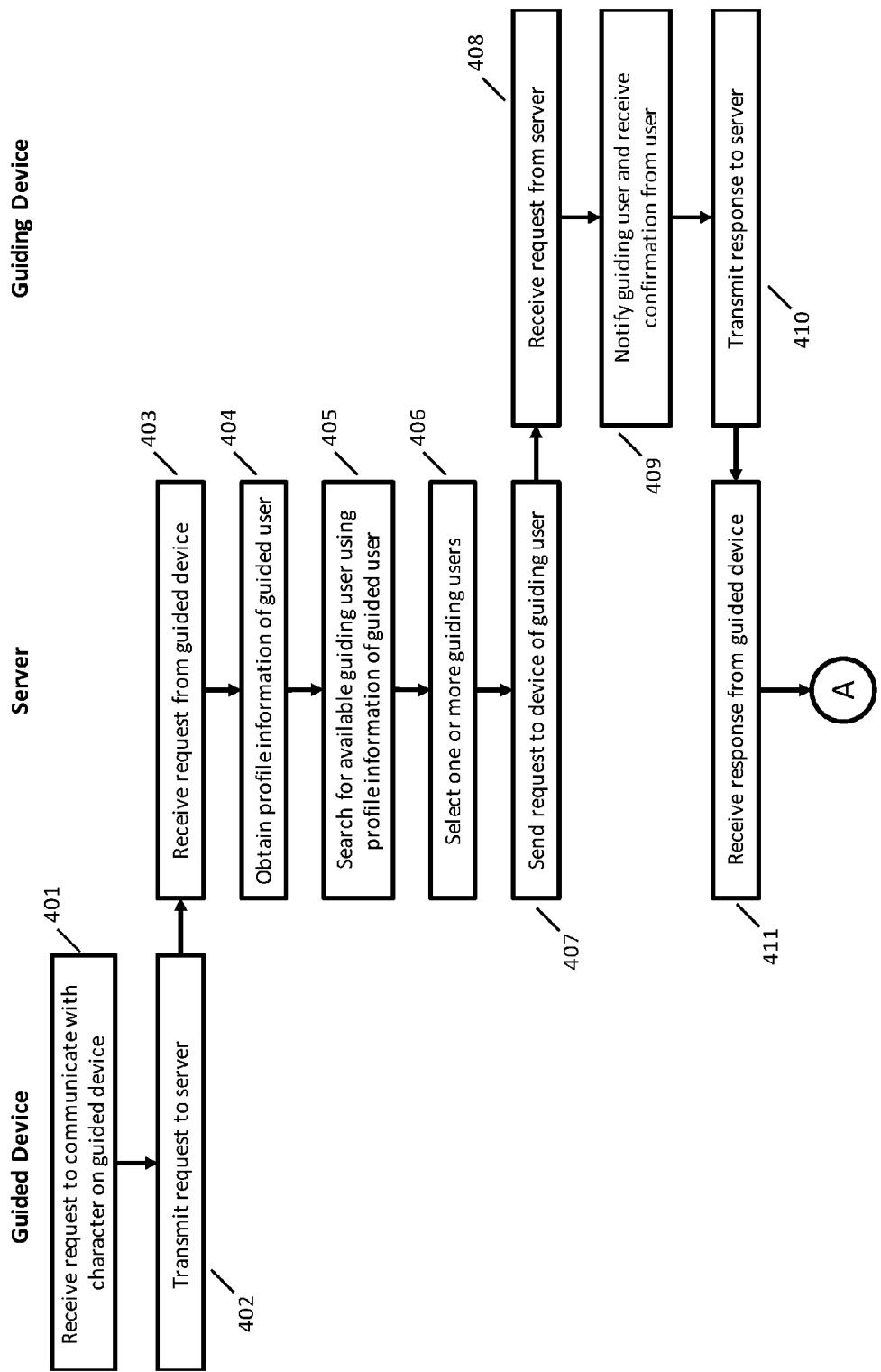
FIGS. 4A, 4B, and 4C are flowcharts illustrating an example implementation of providing an on-demand assistant for guiding a virtual companion on a Hero device.
Figure 4B:
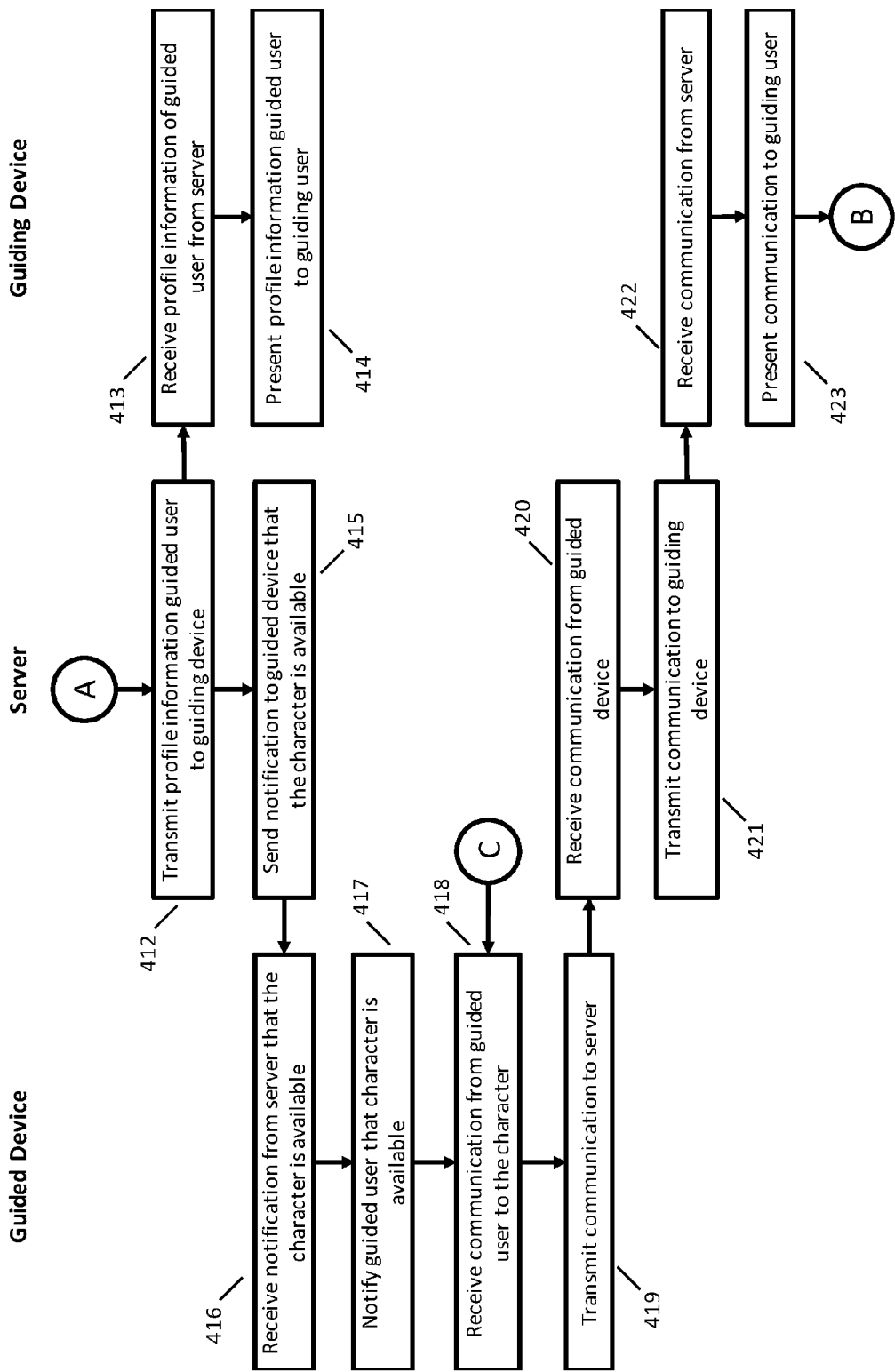
Figure 4C:
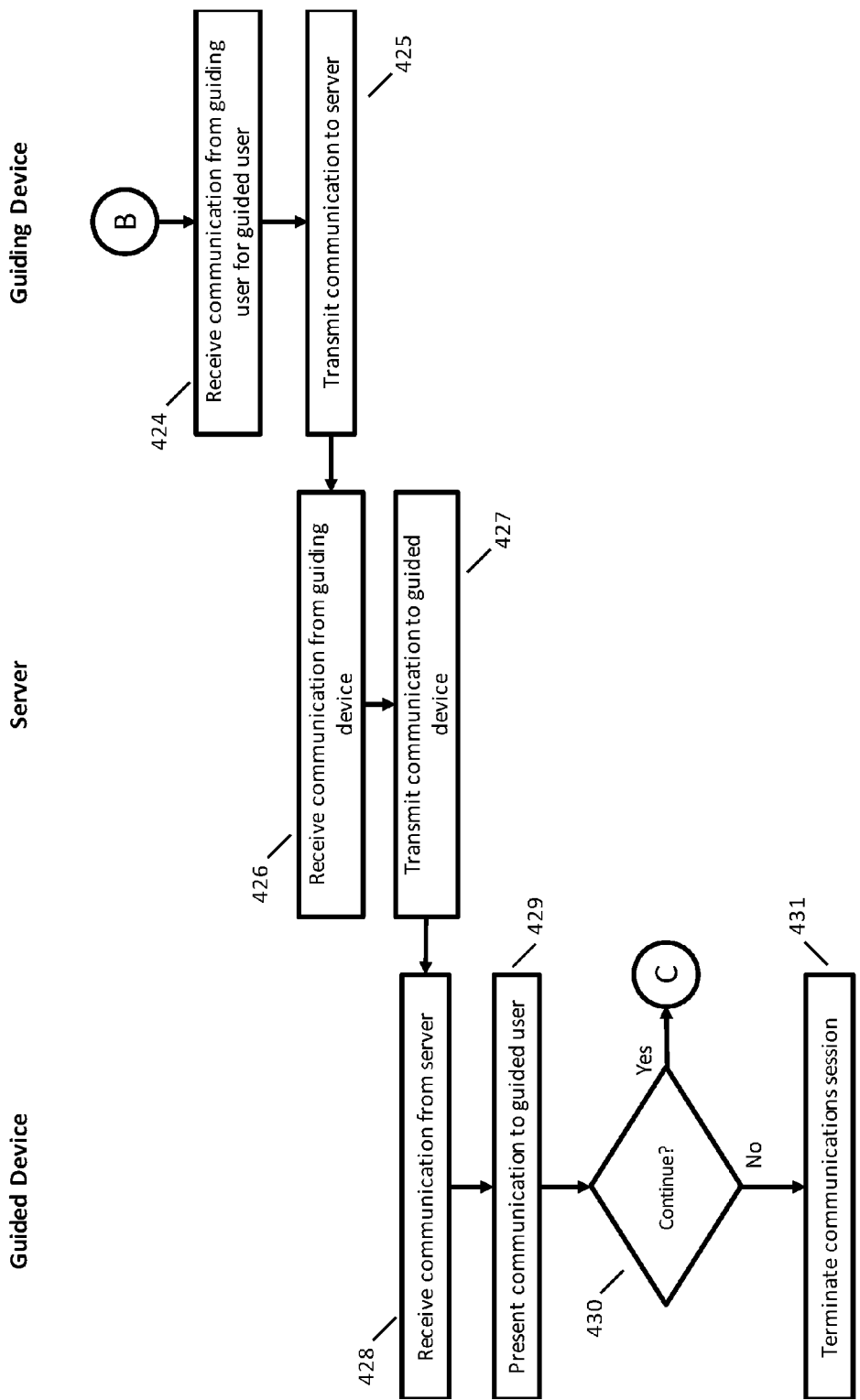

In some implementations, a Coach may be selected to assist a Hero as illustrated by FIGS. 4A-C. FIGS. 4A-C describe interactions between a guided device, a server, and a guiding device. A guiding device may be any device used by a Coach, such as any of the devices described above, to assist in guiding a Sidekick communicating with the Hero. The server may be any computer that facilitates the process, such as a Sidekicks server and/or a server of a Coach-providing service. A guided device may be any device used by a Hero, such as any of the devices described above, to interact with a Sidekick.

A guided user is any person who is interacting with a character on a guided device. A Hero is an example of a guided user, but a guided user is not limited to any of the characteristics of a Hero described herein. A guiding user is any person who is assisting in guiding a character for a guided user. A Coach is an example of a guiding user, but a guiding user is not limited to any of the characteristics of a Coach described herein. Any of the techniques described herein may be performed by a guided user or a guiding user and are not limited to Heroes and Coaches. As used herein, guiding a character on a device for a guided user may include any actions that direct or have an influence on the representation of the character on the guided device, including but not limited to communications presented by the character.

At step 401, an input is received at the guided device (e.g., Hero device) indicative of a request for a user of the guided device (e.g., Hero) to communicate with a character (e.g., Sidekick) presented by the guided device. For example, an image or video of the character may be presented on a display of the guided device. A character may represent any persona or virtual companion for interacting with a Hero, and a Sidekick is an example of a character. The character may be a still image or may be animated, may correspond to a real person, may be a known character from a fictional work, or may be a character that was specially created for the guided device.

In some implementations, the guided user, in requesting to communicate with the character, may not know that the character is being guided by another person (e.g., a Coach or a user of the guiding device). In some implementations, the guided user may know that the character is guided by a guiding user. For example, the guided user may be interacting with the character in an automated mode and may desire additional functionality that requires a person to provide guidance to the character, and may explicitly request the assistant of a guiding user.

In some implementations, the guided user may have multiple options in requesting to communicate with the character that specify a type of guiding user to request. For example, the guided user may have a first option to request a guiding user that does not require payment (e.g., a family member) and a second option to request a guiding user that does require payment (e.g., from a Coach-providing service). In another example, a guided user may have options depending on his current needs, such as requesting a guiding user solely for fun, requesting a guiding user to help him with a non-stressful task, or requesting a guiding user to assist with a stressful situation.

After the guided user requests to communicate with the character on the guided device, it may take some time until a guiding user is available to assist. In some implementations, during this time, the guided device may take actions to entertain or provide automatic assistance to the guided user. For example, as described in greater detail below, the guided device may start a chat bot, play a video, or repeat a previous lesson until a guiding user begins to provide assistance.

At step 402, information indicative of the request to communicate with the character is transmitted to the server, and at step 403, the information is received by the server. The information indicative of the request may include information that may be used to select a person (e.g., Coach) to guide the character. For example, the request may include a unique ID of the guided user so that the server may obtain more information about the guided user, such as from a profile of the guided user.

The request may include other information, such as any of the options described above (e.g., free Coach versus a paid Coach) or a desired skill level or minimum skill level of the guiding user to be selected to provide guidance to the guided user. In some implementations, other sensor data (e.g., audio data, video data, or biometric data) may be provided to the server, and the server may use this information in selecting a guiding user. For example, as described in greater detail below, the sensor data may indicate that the guided user is stressed, and this information may be used to determine a desired skill level of a guiding user.

In some implementations, the request for the guided user to speak with the character may come from a source other than the guided device. For example, a parent or teacher may determine that the guided user needs assistance and initiate a search for a guiding user to assist. In another example, the request for a guiding user may be determined by a schedule or based on a calendar of the guided user. The guided user may need the assistance of a guiding user every day at 7:30 a.m. or a personal calendar of the guided user may indicate times when the guided user needs assistance, such as before a potentially stressful situation (e.g., a dentist appointment).

At step 404, a profile of the guided user is obtained. The profile may be retrieved, for example, from a data store of guided users using a unique ID of the guided user. The profile of the guided user may include any of the information described above.

At step 405, a search is performed for one or more available guiding users using any of the techniques described above. For example, the search algorithm may be specific to the guiding user, may have mandatory requirements, and may compute a score that indicates a suitability of a guiding user to guide the guided user.

At step 406, one or more guiding users are selected. For example, of the available guiding users, a top-scoring guiding user may be selected, a top-N number of guiding users may be selected, or all guiding users with a score above a threshold may be selected.

At step 407, information indicative of a request to provide guidance for the guided user is sent to a device of a guiding user. The request may be sent using any suitable notification technique, such as sending a text message, sending an email, or providing a notification in an application used by the guiding user. Requests may be sent to multiple guided users simultaneously.

At step 408, the request is received by the device of the guiding user (the guiding device). At step 409, the guiding user is notified of the request to provide guidance, such as by presenting a visual or auditory notification. At step 409, a user interface may be presented to allow the guiding user to respond to the request. For example, buttons, such as "accept" and "decline" buttons, may be presented on the display of the guiding device. In some implementations, additional information about the guided user (e.g., name, picture, etc.) may be presented to the guiding user before the guiding user responds.

At step 410, the response of the guiding user is transmitted to the server and at step 411, the response is received by the server. If the guiding user declines the request to assist, the server may wait for another guiding user to respond or may proceed to step 407 to seek assistance from another guiding user. If the guiding user is the first to accept the request, then processing may proceed to step 412. If the guiding user accepts the request, but another guiding user has already accepted the request, then the guiding user may be informed that the request has been assigned to another guiding user.

When requests are sent to multiple guiding users, any appropriate techniques may be used to select a guiding user to be assigned to a request. For example, a first guiding user to respond may be assigned to the request; of all guiding users responding within a period of time (e.g., two minutes), the guiding user with a highest suitability score may be selected; or there may be a suitability score threshold that decreases over time (e.g., within one minute of the request a 90% suitability score is required, from 1-2 minutes of the request an 80% suitability score is required and so forth). Other factors may be considered as well. A guiding user who has previously worked with a guided user may be favored over another guiding user who has not previously worked with the guided user. Rankings of parents of the guided user may be considered so that guiding users ranked higher by the parents may be favored over guiding users ranked lower by the parents.

In some implementations, requests may first be sent to family members of the guided user or other guiding users who are not paid to provide guidance. These people may be referred to as "free" guiding users as opposed to "paid" guiding users from a Coach-providing service. The paid guiding users may be a backup for when free guiding users are not available. Accordingly, requests may first be sent to one or more free guiding users. If the free guiding users respond that they are unavailable or do not respond within a specified period of time, then requests may be sent to paid guiding users.

At step 411, a response from a guiding user accepting the request is received and that guiding user is selected to guide a character for the guided user (using any of the selection techniques described above), and the process may proceed directly to step 415 or may optionally include steps 412 to 414.

At step 412, at least some profile information of the guided user may be sent to the guiding device. For example, any of the name, age, picture, and affinities may be sent to the guiding device. At step 413 the profile information of the guided user is received at the guiding device, and at step 414 the received profile information of the guided user is presented to the guiding user, such as by presenting it on a display of the guiding device. The guiding user may use the profile information of the guided user to help prepare for a communications session with the guided user.

At step 415, a notification is sent to the guided device that a guiding user is available to guide the character on the guided device, and at step 416, the notification is received by the guided device. At step 417, the user of the guided device may be notified that the character is available. For example, a display of the guided device may change to an interface where the guided user is able to communicate with the character or the character may change in appearance, such as from gray to color. In some implementations, the guided user may not be notified that the character is now being guided by the guided user, and it may be unknown to the guided user whether the character is automated or guided.

After step 417, the guided user may communicate with the character with the assistance of the guiding user. As with any conversation, either the guided user or the character may make the first communication, and the two may alternate communications, or one may make multiple communications in a row. The following gives an example of a communications session with a first communication by the guided user followed by a communication by the character.

At step 418, a communication is received from the guided user that is directed towards the character. For example, the guided user may speak and the speech may be captured by a microphone of the guided device or the guided user may type a message using a keyboard of the guided device. At step 419, the communication is transmitted from the guided device to the server, at step 420 the communication is received by the server, at step 421 the communication is transmitted by the server to the guiding device, and at step 422 the communication is received by the guiding device. During the process of transmitting the communication from the guided device to the guiding device, the communication may be modified. For example, any of the guided device, server, and guiding device, may perform speech recognition on speech in the communication. For these, and any other communications between the guided user and the guiding user, encryption and any other appropriate technology may be implemented to comply with security and confidentiality requirements of medical information.

At step 423, the communication is presented to the guiding user by the guiding device. For example, where the communication includes speech, the guiding user may hear the guided user in real time, and where the communication includes text, the guiding user may see the text as the guided user types or shortly after the guided user sends the text.

At step 424, the guiding user provides guidance via the character of the guided device. The guidance may include any of the guidance described in the applications that are incorporated by reference. For example, the guiding user may speak a phrase to be spoken by the character (e.g., by using speech recognition to obtain text of the guiding user's speech and then using a text-to-speech voice of the character), type a phrase to be spoken by the character, select a phrase from a list of suggested phrases to be spoken by the character, or select a video clip to be presented by the guided device.

At step 424, the communication is received by the guiding device, at step 425 the communication is transmitted to the server, at step 426 the communication is received by the server, at step 427, the communication is transmitted by the server to the guided device, and at step 428 the communication is received by the guided device.

During the process of transmitting the communication from the guiding device to the guided device, the communication may be modified. For example, any of the guided device, server, and guiding device, may perform text-to-speech processing to convert text to an audio signal to be played by the guided device.

At step 429, the communication is presented to the guided user by the guided device. For example, audio may be played by the guided device that was generated using a text-to-speech voice corresponding to the character, a text message may be presented on a display of the guided device, or a video clip may be played by the guided device. The character on the guided device may be presented as an image or may be animated.

At step 430, it is determined whether to continue the communications session. For example, the session may end if the guided user decides to end the conversation with the character or if the guiding user is no longer available to guide the character. If either the guided user or the guiding user ends the communications session, then the session is terminated at step 430. If the communications session continues, then the process may continue, for example, to step 418 where the guided device may receive another communication from the guided user. For clarity of presentation, the process of FIGS. 4A-C is presented as alternating communications from the guided user and the guiding user, but a single user may provide multiple communications before the other user provides a communication. For example, the guided user may provide two or more communications while the guiding user is formulating a response.

In the example of FIGS. 4A-C, a server is used to facilitate communications between the guided device and the guiding device, but in some implementations, at least some of the communications between the guided device and the guiding device may be done using a different server or may be done directly without the use of a server at all.

Any of the above described techniques may be combined with the example process of FIGS. 4A-C. For example, the example process of FIGS. 4A-C may be supplemented with additional steps to: allow the guiding user to request assistance from another guiding user or to be replaced by another guiding user, allow a guiding user to provide assistance to multiple guided users simultaneously, train guiding users, create summaries of sessions for review by others (such as parents of the guided user), or provide evaluations of the guiding user.

Intervention by a Coach

During the course of the day, a Hero may become emotional or stressed or enter into a state where the Hero would benefit from assistance. For example, a Hero could become stressed after meeting a new person. In some situations, the Sidekick may be able to provide assistance to the Hero where the Sidekick is guided by a Coach. The sensors of the Hero device may be able to determine that the Hero is stressed (e.g., by processing heart rate, facial expressions, or speech of the Hero). Based on the stress level, it may be determined to request assistance from a Coach, and a Coach may be made available to guide the Sidekick using any of the techniques described above. The Coach may then guide the Sidekick to help alleviate the stressful situation, such as by reminding the Hero about previous lessons relating to meeting new people.

A Hero device may have a wide variety of sensors that may be used to determine the state of the Hero. The following are non-limiting examples of techniques that may be used to determine the state of the Hero: processing speech of the Hero from an audio signal received from a microphone of the Hero device to determine an emotional state of the Hero (e.g., happy, sad, angry); processing video of the Hero from a video signal received from a camera of the Hero device to determine an emotional state of the Hero; using the location of the Hero using data from sensors of the Hero device (e.g., acquired via a GPS sensor, Wi-Fi signals, or cell phone tower triangulation) because the state of the Hero may depend on where the Hero is (e.g., home, school, or at a new location); or processing biometric data, such as received from a heart rate sensor or a galvanic skin response sensor.

Any suitable techniques may be used to determine the state of the Hero using data received from the Hero device. For example, any classifier known to one of skill in the art may be used to classify the state of the Hero. In some implementations, neural networks or deep learning may be used to process all of the data received from the Hero device to determine the state of the Hero. In some implementations, the data from each sensor may be used to determine a state of the Hero and the results from the different sensor data may be combined using sensor fusion techniques or a rule-based approach.

In some implementations, more specific detection techniques may be used. For example, a crying detector, a yelling detector, or a stimming detector (self-stimulation that may be performed by Heroes with autism). Classifiers may be trained by using data from multiple Heroes or from only the Hero for which the classifier is being created. For example, sensor data may be collected from Hero devices and the data may be labelled as corresponding to an emotional state. The labelled data may then be used to train a classifier to automatically determine the state.

The state of the Hero may be indicated using any suitable techniques. In some implementations, the state of the Hero may be selected from one of a fixed number of possibilities (e.g., normal, happy, sad, angry, scared, or anxious). In some implementations, the determined state of the Hero may be accompanied by a severity score, such as a severity score in the range of 1 to 10, where 10 is the highest severity level and 1 is the lowest severity level. For example, the state of the Hero represented as the combination of "anxious" and 10 would indicate that the Hero is extremely anxious.

The Hero device may monitor the state of the Hero in a variety of situations. In some implementations, the Hero device may only monitor the state of the Hero when the Hero is using a specific application on the Hero device, such as speaking to a Sidekick using the Sidekicks application. In some implementations, the Hero device may monitor the state of the Hero when the Hero is using the Hero device for any purpose (e.g., using an application other than the Sidekicks application). In some implementations, the Hero device may be monitoring the Hero even when the Hero is not using the Hero device. For example, the Hero device may monitor the Hero even when the Hero device is in the pocket of the Hero, in a bag of the Hero, or across the room from the Hero.

In some implementations, the monitoring of the Hero may proceed in various stages to protect the privacy of the Hero. For example, the Hero may have a watch or activity band that is always monitoring the heart rate of the Hero. If the heart rate indicates that additional monitoring would be helpful, then other sensors of the Hero device or another Hero device (e.g., when a smart phone is paired with a watch or an activity monitor) may be activated to obtain more information about the state of the Hero, such as activating a microphone or camera to obtain speech or video of the Hero.

The activation of additional sensors may proceed in multiple stages and may depend on an initial evaluation by sensors that are already monitoring the Hero. For example, initially, the only sensor monitoring the Hero may be a heart rate sensor. If the processing of the heart rate sensor data indicates that the Hero is very stressed, then all available sensors may be immediately turned on to obtain as much information as possible about the Hero. If the processing of the heart rate sensor data indicates that the Hero is mildly stressed, then one additional sensor (e.g., microphone) may be enabled. Depending on the combined processing of the heart rate sensor data and audio data from the microphone, additional sensors may then be enabled to better determine the state of the Hero.

When it is determined that a Hero needs assistance, a Coach may be requested to guide a Sidekick to provide the needed assistance to the Hero. In some implementations, the request for assistance may be sent to particular people, such as the parents of the Hero or a medical professional treating the Hero. In some implementations, the request for assistance may instead or additionally be sent to a Coach-providing service that provides Coaches on demand. The Coach may be requested using any of the techniques described above, such as sending a text message to a parent or a Coach-providing service sending notifications to one or more selected Coaches.

After a request for a Coach, it make take some time for a Coach to be available to guide the Sidekick. For example, a parent may be driving and need to stop the car in a safe place and start a Coach application to begin guiding a Sidekick. In some implementations, automated techniques may be applied to assist the Hero while a Coach is in the process of being requested. The automated techniques may be general to all Heroes or may be adapted specifically to the personality or habits of a particular Hero. For example, the automated techniques may attempt to calm the Hero or distract the Hero from a situation or event that is troubling the Hero. While a Coach is being requested, the Sidekick application on the Hero device may, for example, play calming music, play a favorite video clip of the Hero, repeat a previous lesson about how to handle stressful situations, present a game for the Hero to play, allow the Hero to select or search for a video clip, or start communicating with the Hero using automated techniques, such as a chat bot.

To help the Coach prepare for assisting the Hero, the Coach may be presented with information about the Hero, information about previous sessions with the Hero, and/or information about the current situation of the Hero. This information may be especially helpful where the Coach does not know the Hero (e.g., a Coach from a Coach-providing service). Information about the Hero, such as a Hero profile, may allow a Coach to quickly understand key details of how to interact with the Hero (e.g., the disability and/or skill levels of the Hero). Information about a previous session, such as a transcript, summary, or notes of the session, may help the Coach understand effective communication strategies for the Hero. Additionally, recently captured data from the Hero device may be presented to the Coach, such as the last 5 minutes of audio and/or video captured from the Hero device, the current location of the Hero device, or a plot of the last 5 minutes of the Hero's heart rate. The Coach may use this information to understand the Hero's current situation and provide appropriate assistance.

The process of determining that a Hero needs assistance, obtaining a Coach to assist, and having the Coach guide the Sidekick may be referred to as intervention. The transition to intervention may depend on what the Hero is doing when the intervention is requested. If the Hero is already interacting with an automated Sidekick, then the guiding of the Sidekick by the Coach may be seamless and transparent to the Hero. In some implementations, the Hero may be notified that the Sidekick has switched from an automated mode to being guided by a Coach, such as changing the appearance of the Sidekick from gray to color.

Where the Hero is using the Hero device but not interacting with the Sidekick, any suitable techniques may be used to present the Sidekick to the Hero. For example, a notification may be presented on the display of the Hero device or the Sidekicks application may be automatically opened and presented to the Hero (causing the application the Hero was previously using to be switched to the background or stopped).

Where the Hero is not interacting with the Hero device, any suitable techniques may be used to get the attention of the Hero. For example, audio may be played from speakers of the Hero device (e.g., at high or maximum volume), the display of the Hero device may turn on, a camera flash may be activated, or the Hero device may vibrate. When the Hero picks up the Hero device, the Sidekick may be automatically displayed and communicating with the Hero. In some implementations, the Sidekick may get the attention of the Hero, by specifically addressing the Hero, such as by speaking, "Dan, this is Griff, I want to speak with you. Pick up your phone."

After a Coach has started guiding the Sidekick and, if needed, obtained the attention of the Hero, the Coach and Hero may enter into a communications session via the Sidekick. As described above and in the incorporated patent applications, the Coach receives information about the Hero, such as audio and/or video of the Hero or text typed by the Hero. The Coach may select or formulate a response for the Sidekick and the response may be spoken by the Sidekick on the Hero device using a text-to-speech voice of the Sidekick or may be presented on the display of the Hero device as text.

The communications session may continue until any appropriate stopping point, such as the Coach determining that the Hero no longer needs assistance. After the Coach stops guiding the Sidekick, the Sidekick may enter into an automated mode or the Sidekick may no longer be available to the Hero.

The request for assistance by a Coach may be triggered by situations other than those described above. In some implementations, the request for assistance may be made by another person who is near the Hero and observes that the Hero needs assistance. For example, a teacher, friend, or family member of the Hero may observe that the Hero is stressed. This person may have access to an application that allows them to request the assistance of a Coach on behalf of the Hero, or the person may use other methods to contact someone who can help, such as calling a parent.

In some implementations, the request for assistance may be triggered by the Hero being in an unexpected location. A schedule for the Hero may be specified or obtained from an electronic calendar of the Hero, such as that the Hero should be at school from 8 am to 3 pm on Monday through Friday or that the Hero has a dentist appointment at a particular day and time. When the Hero is not in the expected location, a Coach may be requested to determine why the Hero is not in the expected location and, if needed, to assist the Hero in getting to the expected location.

Figure 5A:
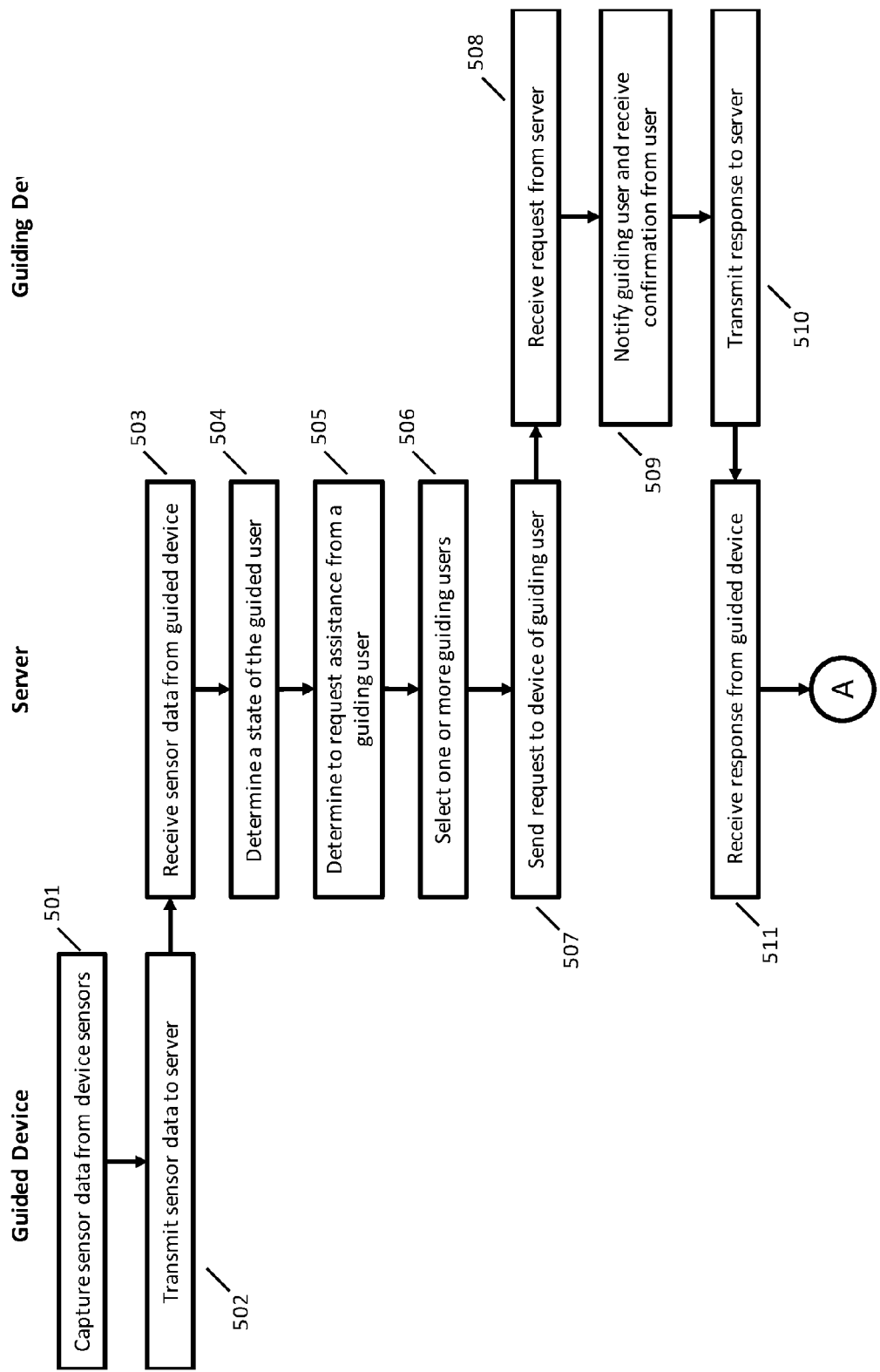
FIGS. 5A and 5B are flowcharts illustrating an example implementation of automatic intervention in guiding a virtual companion.
Figure 5B:
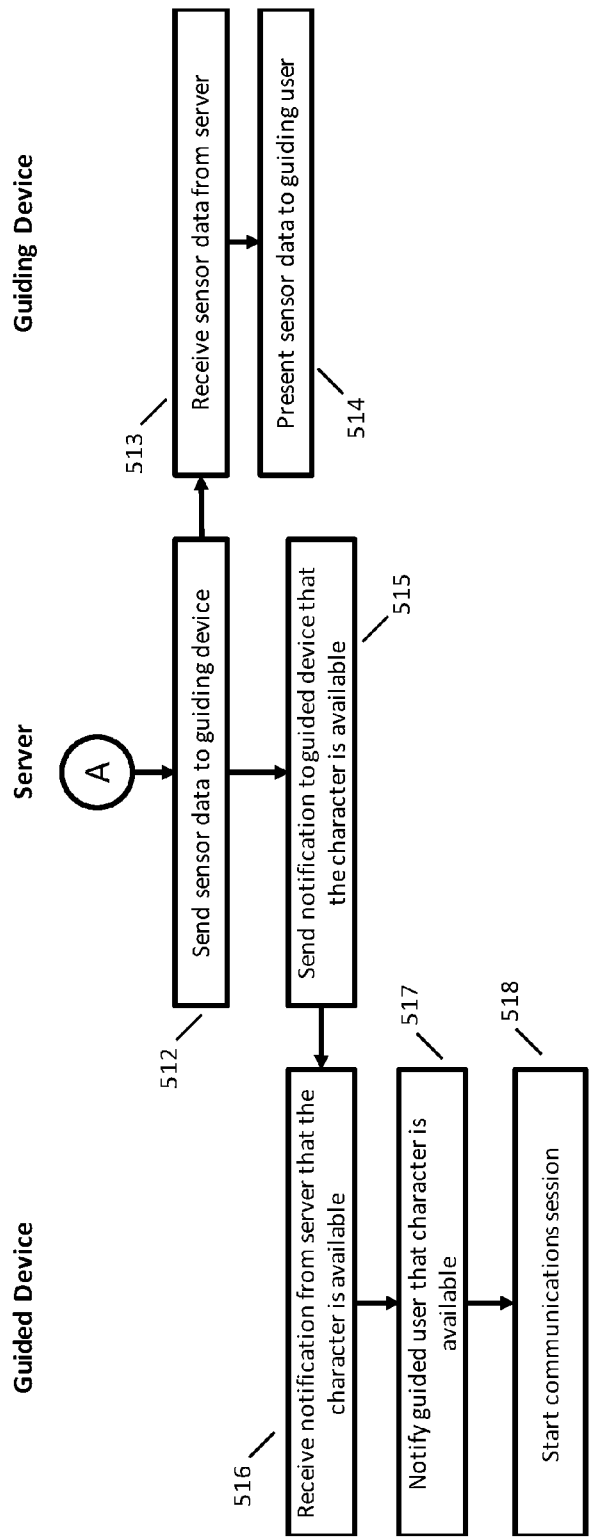

In some implementations, a Coach may be requested to assist a Hero as illustrated by FIGS. 5A-C. FIGS. 5A-C describe interactions between a guided device (e.g., a Hero device), a server (e.g., a Sidekicks server and/or a server of a Coach-providing service), and a guiding device (e.g., a Coach device).

At step 501, sensor data is captured by sensors of the guided device. The sensors may include any sensors found on user devices, such as any of the sensors described above. At step 502, information indicative of the sensor data is transmitted to a server, and at step 503, the information indicative of the sensor data is received by the server. The information indicative of the sensor data may include a subset or a processed version of the sensor data.

At step 504, the information indicative of the sensor data is processed to determine a state of a user of the guided device, such as an emotional state or stress level of the guided user. For example, the information may be input into a classifier and the classifier may output a state (e.g., emotional state) of the guided user and optionally a severity of the state. In some implementations, steps 501 to 504 may be performed continuously so that the state of the guided user is being monitored continuously. In some implementations, a first state of the guided user may be determined using first information indicative of first sensor data from a first sensor. Based on the first state, the guided device may activate a second sensor and second information indicative of second data from the second sensor may additionally be used to determine a second state of the guided user, as described above.

At step 505, it is determined to request assistance from a guiding user. For example, certain states or states in combination with a severity level may indicate that assistance is needed. In some implementations, a location of the guided user may also be used in determining whether to request assistance.

After it is determined to request assistance from a guiding user, it may take some time until a guiding user is available to assist. In some implementations, during this time, the guided device may take actions to entertain or provide automatic assistance to the guided user. For example, the server may be configured to send an instruction to the guided device for the guided device to engage in a mode of automated assistance, and the automated assistance may continue until a guiding user is available to intervene.

At step 506, one or more guiding users are selected to request their availability for assisting the guided user. The selection of a guiding user may use any of the techniques described above. The selection of the guiding user may be based on the determined state of the guided user. For example, some guiding users may be better suited for assisting particular states (e.g., anxiety) or more skilled or more experienced guiding users may be needed depending on a severity level of the state of the guided user.

Steps 507 through 511, send a request to a guiding device, notify a guiding user of the request, receive a response from the guiding user, and transmit the response to the server. These steps may use any of the techniques described above for steps 407 through 411.

At step 512, at least some of the information indicative of the sensor data received from the guided device may be sent to the guiding device and at step 513 the information indicative of the sensor data is received by the guiding device. The information indicative of the sensor data may correspond to any of the sensor data described above and the information may be processed by the server before being sent to the guiding device. At step 514, the information indicative of the sensor data is presented to the guiding user, such as presenting an audio or video clip or a graph of heart rate. The guiding user may review the information to better understand the circumstances of the guided user before guiding the character on the guided device. Steps 512 through 514 are optional and are not performed in some implementations.

Steps 515 through 517, send a notification to the guided device that the character is available and notify the guided user that the character is available. These steps may use any of the techniques described above for steps 415 through 417. At step 518, the guided user enters into a communications session with the character with the character being guided by the guiding user as described above. Step 518 may include any of the techniques described above for steps 418 through 431.

In some implementations, a character on a device may be guided as described in the following clauses, combinations of any two or more of them, or in combination with other clauses presented herein.

1. A system for guiding a character presented by a first device, the system comprising a first device and a server computer, wherein:
   the first device is configured to:
   present the character on a display of the first device,
   receive an input from a first user of the first device indicative of a request to communicate with the character, and
   transmit information indicative of a request to communicate with the character to the server computer;
   the server computer is configured to:
   receive the information indicative of the request to communicate with the character,
   obtain profile information of the first user,
   identify a second user of a plurality of guiding users using a data store, wherein (i) the data store comprises an availability indicator for each of the plurality of guiding users, (ii) the data store comprises profile information for each of the plurality of guiding users, and (iii) the second user is identified by comparing the profile information of the first user with profile information of the second user;
   send, to a second device of the second user, information indicative of a request for the second user to guide the character of the first device,
   receive a first communication from the second device,
   transmit the first communication to the first device;
   the first device is configured to:
   receive the first communication,
   present the first communication to the first user,
   receive a second communication from the first user, and
   transmit the second communication to the server computer; and the server computer is configured to:
   receive the second communication, and
   transmit the second communication to the second device.

2. The system of clause 1, wherein:
   the character is associated with a text-to-speech voice; and
   the first device is configured to present the first communication by presenting speech to the first user, wherein the speech is generated with the text-to-speech voice.

3. The system of clause 1, wherein the server computer is configured to:
   receive an indication from the second user that the second user is available;
   modify the data store to indicate that the second user is available.

4. The system of clause 1, wherein the second user is a family member of the first user or a medical professional who is treating the first user.

5. The system of clause 1, comprising:
   determining a state of the first user; and
   selecting the second user using the state.
6. The system of clause 5, wherein the state of the first user is determined by processing at least one of audio or video received from the first device.
7. The system of clause 5, comprising:
   determining a severity level of the state; and
   selecting the second user using the severity level.
8. The system of clause 1, wherein the first communication or the second communication is modified by the server computer.
9. A method for guiding a character presented by a first device, the method comprising:
   receiving, from the first device, information indicative of a request for a first user of the first device to communicate with the character;
   identifying a second user of a plurality of guiding users by comparing profile information of the first user with profile information of the second user, wherein the profile information of the second user is retrieved from a data store comprising profile information of the plurality of guiding users;
   sending, to a second device of the second user, information indicative of a request for the second user to guide the character of the first device;
   receiving a first communication from the first device;
   transmitting the first communication to the second device;
   receiving a second communication from the second device; and
   transmitting the second communication to the first device.
10. The method of clause 9, comprising:
    determining an amount of time that the second user guides the character of the first device; and
    providing a payment to the second user based on the amount of time.
11. The method of clause 9, wherein:
    the profile information of the first user comprises a disability of the user, an affinity of the user, or a goal of the user; and
    the profile information of the second user comprises a skill level for working with a disability, knowledge of an affinity, experience in working on a goal, or prior experience in working with the first user.
12. The method of clause 9, comprising providing at least a portion of the profile information of the first user to the second device.
13. The method of clause 9, comprising:
    identifying a third user of the plurality of guiding users;
    sending, to a device of the third user, information indicative of a request for the third user to guide the character of the first device;
    receiving a response from the third user that the third user is not available.
14. The method of clause 9, wherein the second user simultaneously guides a second character of a third device.
15. The method of clause 9, where the second user and a third user simultaneously guide the character of the first device.
16. The method of clause 9, comprising:
    receiving, from the second user, information indicative of a request for assistance from a third user;
    sending, to a device of the third user, information indicative of a request for the third user to guide the character of the first device;
    receiving a third communication from the third user; and
    transmitting the third communication to the first device.
17. The method of clause 16, wherein the third user has a higher skill level than the second user, is a medical professional who is treating the first user, or is a family member of the first user.
18. The method of clause 9, comprising:
    identifying a third user of the plurality of guiding users;
    sending, to a third device of the third user, information indicative of a request for the third user to guide the character of the first device; and
    selecting the second user to guide the character of the first device based on at least one of (i) a response time of the second user, (ii) a response time of the third user, (iii) a suitability score of the second user, or (iv) a suitability score of the third user.
19. The method of clause 9, comprising:
    identifying a third user of the plurality of guiding users;
    sending, to a third device of the third user, information indicative of a request for the third user to guide the character of the first device; and
    wherein sending, to the second device of the second user, the information indicative of the request for the second user to guide the character of the first device is in response to (i) determining that the third user is not available or (ii) not receiving a response from the third user within a period of time.
20. One or more non-transitory computer-readable media comprising computer executable instructions that, when executed, cause at least one processor to perform actions comprising:
    receiving, from a first device, information indicative of a request for a first user of the first device to communicate with a character presented by the first device;
    identifying a second user of a plurality of guiding users by comparing profile information of the first user with profile information of the second user, wherein the profile information of the second user is retrieved from a data store comprising profile information of the plurality of guiding users;
    sending, to a second device of the second user, information indicative of a request for the second user to guide the character of the first device;
    receiving a first communication from the first device;
    transmitting the first communication to the second device;
    receiving a second communication from the second device; and
    transmitting the second communication to the first device.
21. The one or more non-transitory computer-readable media of clause 20, the actions comprising training the second user by automating the communications of the first user or using a script for the communications of the first user.
22. The one or more non-transitory computer-readable media of clause 20, wherein the first communication comprises speech of the first user or text typed by the first user.
23. The one or more non-transitory computer-readable media of clause 20, the actions comprising:
    creating a summary of communications between the first user and the second user; and
    providing the summary to a parent of the first user or a medical professional treating the first user.
24. The one or more non-transitory computer-readable media of clause 20, the actions comprising:
    receiving an evaluation of the second user; and
    storing the evaluation in the data store.
25. The one or more non-transitory computer-readable media of clause 20, the actions comprising:
    automatically evaluating the performance of the second user; and
    storing the evaluation in the data store.

26. The one or more non-transitory computer-readable media of clause 20, wherein automatically evaluating the performance of the second user comprises (1) determining an amount of time for the first user to respond to a communication, or (2) a number of words in the response of the first user.

In some implementations, assistance may be provided to a user as described in the following clauses, combinations of any two or more of them, or in combination with other clauses presented herein.

1. A system for providing assistance to a first user of a first device, the system comprising the first device and a server computer, wherein:
the first device is configured to:
present a character on a display of the first device,
obtain sensor data from a sensor of the first device, and
transmit, to the server computer, information indicative of the sensor data; the server computer is configured to:
determine a state of the first user of the first device by processing the information indicative of the sensor data,
determine to request assistance based on the state of the first user,
send information indicative of a request for assistance to a second device of a second user,
receive a communication from the second device, and
transmit the communication to the first device; and the first device is configured to:
present the communication to the first user.

2. The system of clause 1, wherein:
the character is associated with a text-to-speech voice; and
the first device is configured to present the communication by presenting speech to the first user, wherein the speech is generated with the text-to-speech voice.

3. The system of clause 1, wherein the sensor data comprises at least one of (i) audio captured from a microphone of the first device, (ii) video captured by a camera of the first device, or (iii) biometric data captured from a biometric senor of the first device.

4. The system of clause 1, wherein the first device is configured to obtain the sensor data while the first user is interacting with an application on the first device.

5. The system of clause 1, wherein the first device is configured to obtain the sensor data while the first user is not interacting with the first device.

6. The system of clause 1, wherein the first device is configured to allow the user of the first device to engage in a communications session with an automated agent.

7. The system of clause 1, wherein the first device is configured to provide an indication that the character is being guided by the second user.

8. The system of clause 1, wherein the first device or the server computer is configured to:
prior to receiving the communication from the second device, cause the first device to take an action to assist the first user of the first device.

9. The system of clause 8, wherein the action comprises the first device speaking to the first user, playing a video, or playing music.

10. The system of clause 1, wherein the communication is modified by the server computer.

11. A method for providing assistance to a first user of a first device, the method comprising:
obtaining information indicative of sensor data captured by a sensor of the first device;
determining a state of the first user of the first device by processing the sensor data;
determining to request assistance based on the state of the first user;
sending, to a second device of a second user, information indicative of a request for assistance;
receiving a first communication from the second device;
transmitting the first communication to the first device;
receiving a second communication from the first device; and
transmitting the second communication to the second device.

12. The method of clause 11, comprising:
obtaining location data indicating a location of the first device; and
wherein determining the state of the first user comprises processing the location data.

13. The method of clause 11, wherein determining the state of the first user by processing information indicative of the sensor data comprises:
determining a first state of the first user by processing first information indicative of first sensor data captured by a first sensor;
obtaining second information indicative of second sensor data captured by a second sensor of the first device; and
determining a second state of the first user by processing the second information indicative of the second sensor data.

14. The method of clause 13, wherein the second sensor data comprises at least one of (i) audio captured from a microphone of the first device, (ii) video captured by a camera of the first device, or (iii) biometric data captured from a biometric senor of the first device.

15. The method of clause 11, comprising transmitting at least a portion of the information indicative of the sensor data to the second device.

16. The method of clause 11, comprising:
sending information indicative of a request for assistance to a third device of a third user;
determining that the third user is not available; and
wherein sending the information indicative of the request for assistance to the second device is in response to determining that the third user is not available.

17. The method of clause 16, wherein determining that the third user is not available comprises (1) receiving an indication from the third user that the third user is not available, or (2) not receiving a response from the third user within a period of time of sending the information indicative of the request for assistance to the third device.

18. One or more non-transitory computer-readable media comprising computer executable instructions that, when executed, cause at least one processor to perform actions comprising:
obtaining information indicative of sensor data captured by a sensor of a first device;
determining a state of a first user of the first device by processing the information indicative of the sensor data;
determining to request assistance based on the state of the first user;
sending, to a second device of a second user, a information indicative of a request for assistance;
receiving a first communication from the second device;
transmitting the first communication to the first device;
receiving a second communication from the first device; and
transmitting the second communication to the second device.

19. The one or more non-transitory computer-readable media of clause 18, wherein the information indicative of the sensor data corresponds to at least one of (i) audio captured from a microphone of the first device, (ii) video captured by a camera of the first device, or (iii) biometric data captured from a biometric senor of the first device.

20. The one or more non-transitory computer-readable media of clause 18, the actions comprising identifying the second user using information about the first user.

21. The one or more non-transitory computer-readable media of clause 18, the actions comprising:
determining a severity level of the state; and
identifying the second user using the severity level.

22. The one or more non-transitory computer-readable media of clause 18, the actions comprising identifying the second user by selecting the second user from a data store of guiding users.

23. The one or more non-transitory computer-readable media of clause 18, wherein the state of the first user comprises an emotional state.

In some implementations, assistance may be provided to a user as described in the following clauses, combinations of any two or more of them, or in combination with other clauses presented herein.

1. A system for providing assistance to a user of a first device, the system comprising the first device and a server computer, wherein:
the first device is configured to:
present the character on the first device,
obtain information indicative of a need for assistance, and
transmit, to the server computer, information indicative of the need for assistance;
the server computer is configured to:
identify a second user of a plurality of guiding users,
send, to a second device of a second user, information indicative of a request for assistance,
receive a first communication from the second device, and
transmit the first communication to the first device; and
the first device is configured to:
receive the first communication,
present the first communication to the first user,
receive a second communication from the first user, and
transmit the second communication to the server computer; and the server computer is configured to:
receive the second communication, and
transmit the second communication to the second device.

2. The system of clause 1, wherein the information indicative of a need for assistance comprises (i) information indicative of a request to communicate with the character or (ii) information indicative of sensor data captured by a sensor of the first device.

Figure 6:
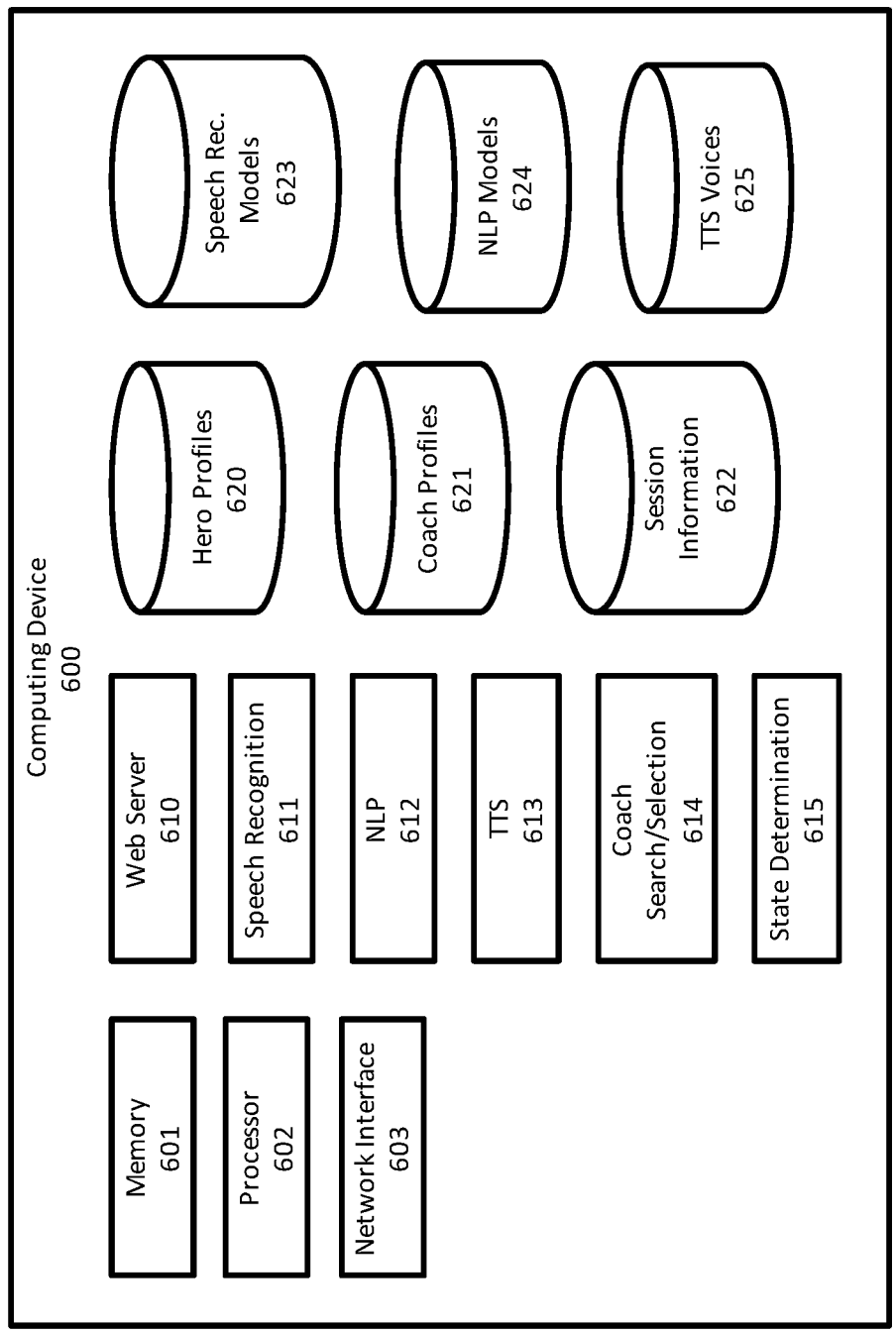
FIG. 6 illustrates components of a computing device that may be used to guide a virtual companion.

FIG. 6 illustrates components of some implementations of a computing device 600 that may be used for any of a Hero device, a guided device, a Coach device, a guiding device, or a server that operates in conjunction with any of the foregoing devices. In FIG. 6 the components are shown as being on a single computing device, but the components may be distributed among multiple computing devices, such as among any of the devices mentioned above or among several server computing devices.

Computing device 600 may include any components typical of a computing device, such one or more processors 602, volatile or nonvolatile memory 601, and one or more network interfaces 603. Computing device 600 may also include any input and output components, such as displays, keyboards, and touch screens. Computing device 600 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 600 may include a web server component 610 for interacting with other devices, such as Hero device or Coach device. Web server component 610 may provide a user interface and other functionality to allow the Hero and/or Coach to interact with the Sidekicks service. Computing device 600 may include a speech recognition component 611 that may be used to recognize speech of a Hero, a Coach, or other people. The speech recognition results may be used, for example, to generate transcripts of a session or to facilitate a Coach in guiding a Sidekick. Computing device 600 may include a natural language processing (NLP) component 612, that may be used to process speech recognition results and generate NLP results indicating a meaning of the processed speech. NLP results may be used, for example, to automatically process a Hero's speech and generate suggestions adapted to the Hero's speech. Computing device 600 may include a TTS component 613 that may be used to generate audio from provided text (or other input), for example, to provide audio to be spoken by a Sidekick. Computing device 600 may include a Coach search/selection component 614 that may be used to search a data store of Coaches, select Coaches for consideration, send requests to Coaches, and select a Coach to guide a Sidekick using any of the techniques described above. Computing device 600 may include a state determination component 615 that may be used to determine a state of a Hero using any of the techniques described above.

Computing device 600 may include or have access to various data stores, such as data stores 620, 621, 622, 623, 624, and 625. Data stores may use any known storage technology such as files or relational or non-relational databases. For example, computing device 600 may have a Hero profiles data store 620 to store any of the information described above about Heroes. Computing device 600 may have a Coach profiles data store 621 to store any of the information described above about Coaches. Computing device 600 may have session information data store 622 that may be used to store information regarding a communications session between a Hero and a Coach, such as a transcript, audio, video, or comments. Computing device 600 may further have a speech recognition models data store 623 that may be used by speech recognition component 611, an NLP models data store 624 that may be used by NLP component 612, and a TTS voices data store 625 that may be used by TTS component 613.

The system and techniques described above therefore comprise technological improvements to several underlying technologies, including (among others): the technology of back-and-forth communication between two devices through a communication network to enable a user of one of the devices to manage operation of an application on the other of the devices; the technology of providing features in a user interface that are presented to a user of a device, based on information specified by a user of a second device; the technology of providing features in a user interface that help a user of a device to coach a user of another device by means of information and commands sent from the first device to the second device. The technological improvements include (among others) enhancing a user interface at one or both of the devices to provide additional and modified features based on information and commands sent through a communication network between the first device and the second device; providing information through a communication network to a user of one of the devices that help the user in controlling the application running on the other device; providing features of the user interface on the other of the devices that enhance the familiarity, comfort, and fluidity of the interaction by a user of the other device; and providing for selected, timed and choreographed communication back and forth between the two devices that facilitates real-time or near real-time virtual interaction between users of the two devices.

Depending on the implementation, steps of any of the techniques described above may be performed in a different sequence, may be combined, may be split into multiple steps, or may not be performed at all. The steps may be performed by a general purpose computer, may be performed by a computer specialized for a particular application, may be performed by a single computer or processor, may be performed by multiple computers or processors, may be performed sequentially, or may be performed simultaneously.

The techniques described above may be implemented in hardware, in software, or a combination of hardware and software. The choice of implementing any portion of the above techniques in hardware or software may depend on the requirements of a particular implementation. A software module or program code may reside in volatile memory, non-volatile memory, RAM, flash memory, ROM, EPROM, or any other form of a non-transitory computer-readable storage medium.

Conditional language used herein, such as, "can," "could," "might," "may," "e.g.," is intended to convey that certain implementations include, while other implementations do not include, certain features, elements and/or steps. Thus, such conditional language indicates that that features, elements and/or steps are not required for some implementations. The terms "comprising," "including," "having," and the like are synonymous, used in an open-ended fashion, and do not exclude additional elements, features, acts, operations. The term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood to convey that an item, term, etc. may be either X, Y or Z, or a combination thereof. Thus, such conjunctive language is not intended to imply that certain embodiments require at least one of X, at least one of Y and at least one of Z to each be present.

While the above detailed description has shown, described and pointed out novel features as applied to various implementations, it can be understood that various omissions, substitutions and changes in the form and details of the devices or techniques illustrated may be made without departing from the spirit of the disclosure. The scope of inventions disclosed herein is indicated by the appended claims rather than by the foregoing description. All changes which come within the meaning and range of equivalency of the claims are to be embraced within their scope.

What is claimed is:

1. A system for providing a communications session using a guided character wherein the communications session comprises a first device streaming audio and video of a first user to be presented to a second user of a second device and the second device transmitting a phrase to the first device to be played as audio by the first device using a text-to-speech voice of the guided character, the system comprising the first device, a server computer, and the second device, wherein:

the first device is configured to:
 present the character on a display of the first device,
 receive an input from the first user of the first device indicative of a request to start the communications session with the character, and
 transmit information indicative of the request to start the communications session with the character to the server computer;

the server computer is configured to:
 receive the information indicative of the request to start the communications session with the character,
 obtain profile information of the first user,
 identify the second user in a data store of guiding users, wherein (i) the data store comprises an availability indicator for each of the guiding users, (ii) the data store comprises profile information for each of the guiding users, and (iii) the second user is identified by comparing the profile information of the first user with profile information of the second user;
 send, to the second device of the second user, information indicative of a request for the second user to guide the character presented by the first device in the communications session,
 receive, from the second device, an acceptance of the request, and
 after the acceptance of the request has been received, start the communications session wherein, during the communications session, the server computer (i) streams an audio signal from the first device to the second device in real time, (ii) streams a video signal from the first device to the second device in real time, (iii) receives information corresponding to the phrase to be spoken by the character from the second device, and (iv) causes the first device to present audio of the character speaking the phrase using the text-to-speech voice of the character, and wherein the communications session comprises multiple audio communications of the first user and multiple phrases spoken by the character;

the first device is configured to join the communications session after the communications session has been started by the server computer, wherein during the communications session, the first device (i) streams the audio signal corresponding to audio captured by a microphone of the first device to the server computer, (ii) streams the video signal corresponding to video captured by a camera of the first device to the server computer, (iii) receives information corresponding to the phrase from the server computer, and (iv) presents audio of the phrase using the text-to-speech voice of the character;

the second device is configured to join the communications session after the communications session has been started by the server computer, wherein during the communications session, the second device (i) presents audio corresponding to the streamed audio signal, (ii) presents video corresponding to the streamed video signal, (iii) receives the information corresponding to the phrase from the second user, and (iv) transmits the information corresponding to the phrase to the server computer; and the server computer is configured to:
evaluate the performance of the second user,
determine that the performance level of the second user is lower than a performance threshold, and
request assistance of a third user.

2. The system of claim 1, wherein:
the first user is a child with autism; and
the second user has been trained to communicate with autistic children.

3. The system of claim 1, wherein the second user specifies the phrase by at least one of: selecting the phrase from a list of phrases, typing the phrase, or speaking the phrase.

4. The system of claim 1, wherein the second user is a family member of the first user or a medical professional who is treating the first user.

5. The system of claim 1, wherein:
the second device is configured to present, during the communications session, a list of video clips to the second user, receive a selection of a video clip by the second user, and transmit information indicative of the selected video clip to the server computer; and
the server computer is configured to receive, during the communications session, the information indicative of the selected video clip and cause the video clip to be presented by the first device and the second device.

6. The system of claim 1, wherein the server computer is configured to:
create a summary of the communications session, wherein the summary comprises at least one of: a transcript of at least a portion of the communications session, audio of at least a portion of the communications session, or video of at least a portion of the communications session; and
transmit the summary to a person other than the first user.

7. The system of claim 1, wherein the server computer is configured to:
compute a suitability score using the profile of the first user and the profile of the second user; and
select the second user using the suitability score.

8. A computer-implemented method for providing a communications session using a guided character wherein the communications session comprises a first device streaming audio and video of a first user to be presented to a second user of a second device and the second device transmitting a phrase to the first device to be played as audio by the first device using a text-to-speech voice of the guided character, the method comprising:
receiving, from the first device, information indicative of a request of the first user of the first device to start the communications session with the character;
identifying the second user among possible guiding users by comparing profile information of the first user with profile information of the second user, wherein the profile information of the second user is retrieved from a data store comprising profile information of the possible guiding users;
sending, to the second device of the second user, information indicative of a request for the second user to guide the character presented by the first device in the communications session;
receiving, from the second device, an acceptance of the request;
after the acceptance of the request has been received, starting, by a computer, the communications session between the first device and the second device wherein, during the communications session, the computer (i) streams an audio signal from the first device to the second device in real time, (ii) streams a video signal from the first device to the second device in real time, (iii) receives information corresponding to the phrase to be spoken by the character from the second device, and (iv) causes the first device to present audio of the character speaking the phrase using the text-to-speech voice of the character, and wherein the communications session comprises multiple audio communications of the first user and multiple phrases spoken by the character;
adding a third device of a third user to the communications session, wherein the third user is a guiding user;
streaming the audio signal to the third device in real time;
streaming the video signal to the third device in real time;
receiving information about a second phrase to be spoken by the character from the third device; and
causing the first device to present audio of the character speaking the second phrase using the text-to-speech voice of the character.

9. The computer-implemented method of claim 8, comprising:
computing a suitability score for each of the guiding users, wherein each suitability score is computed using a profile of the first user and a profile of a guiding user; and
wherein the second user is identified using the suitability scores.

10. The computer-implemented method of claim 9, comprising:
identifying a third user using the suitability scores;
sending, to a third device of the third user, information indicative of a request for the third user to guide the character of the first device in the communications session; and
selecting the second user using a response time of the second user and a response time of the third user.

11. The computer-implemented method of claim 10, wherein the second user responded before the third user.

12. The computer-implemented method of claim 8, wherein the third device is added to the communications session in response to an end of a work shift of the second user or in response to the first user needing additional assistance.

13. The computer-implemented method of claim 8, comprising facilitating communications between the second user and the third user and wherein the first user does not receive the communications between the second user and the third user.

14. The computer-implemented method of claim 8, wherein the third user is at least one of: more highly skilled than the second user, a medical professional who is treating the first user, or a family member of the first user.

15. One or more non-transitory computer-readable media comprising computer executable instructions that, when executed, cause at least one processor to perform actions comprising:
receiving, from a first device, information indicative of a request of a first user of the first device to start a communications session with a character presented by the first device;
identifying a second user among possible guiding users by comparing profile information of the first user with profile information of the second user, wherein the profile information of the second user is retrieved from a data store comprising profile information of the possible guiding users;

sending, to a second device of the second user, information indicative of a request for the second user to guide the character presented by the first device in the communications session;

receiving, from the second device, an acceptance of the request;

after the acceptance of the request has been received, starting, by a computer, the communications session between the first device and the second device wherein, during the communications session, the computer (i) streams an audio signal from the first device to the second device in real time, (ii) streams a video signal from the first device to the second device in real time, (iii) receives a information about a phrase to be spoken by the character from the second device, and (iv) causes the first device to present audio of the character speaking the phrase using a text-to-speech voice of the character, and wherein the communications session comprises multiple audio communications of the first user and multiple phrases spoken by the character;

adding a third device of a third user to the communications session, wherein the third user is a guiding user;

streaming the audio signal to the third device in real time;

streaming the video signal to the third device in real time; and disconnecting (i) the second device from the communications session while the third device is still part of the communications session or (ii) the third device from the communications session while the second device is still part of the communications session.

16. The one or more non-transitory computer-readable media of claim 15, the actions comprising:
   determining a state and severity level of the first user using audio or video or both received from the first device; and
   selecting the second user using the state and the severity level.

17. The one or more non-transitory computer-readable media of claim 15 in which the actions comprise:
   receiving an evaluation of the second user by a person other than the first user; and
   updating a profile of the second user with the evaluation.

18. The one or more non-transitory computer-readable media of claim 15 in which the actions comprise:
   evaluating the second user by at least one of (1) determining an amount of time for the first user to respond to the phrase presented by the character or (2) a number of words in a response of the first user; and
   updating a profile of the second user with the evaluation.

19. The one or more non-transitory computer-readable media of claim 15, wherein audio comprising speech of the second user is not presented to the first user and video of the second user is not presented to the first user.

* * * * *

UNITED STATES PATENT AND TRADEMARK OFFICE
CERTIFICATE OF CORRECTION

PATENT NO. : 9,802,125 B1
APPLICATION NO. : 15/166333
DATED : October 31, 2017
INVENTOR(S) : Ronald Steven Suskind et al.

Page 1 of 1

It is certified that error appears in the above-identified patent and that said Letters Patent is hereby corrected as shown below:

In the Claims

Column 31, Line 14: In Claim 15, before "information" delete "a".

Signed and Sealed this
Thirteenth Day of February, 2018

Andrei Iancu
*Director of the United States Patent and Trademark Office*